Sept. 22, 1959 E. O. BLODGETT ET AL 2,905,298
WRITING MACHINE

Filed Sept. 20, 1955 17 Sheets-Sheet 1

INVENTORS
EDWIN O. BLODGETT
BY WILBUR C. AHRNS
ATTORNEY

Sept. 22, 1959　　　E. O. BLODGETT ET AL　　　2,905,298
WRITING MACHINE

Filed Sept. 20, 1955　　　　　　　　　　17 Sheets-Sheet 2

INVENTORS
EDWIN O. BLODGETT
BY　WILBUR C. AHRNS

ATTORNEY

INVENTORS
EDWIN O. BLODGETT
WILBUR C. AHRNS
BY
ATTORNEY

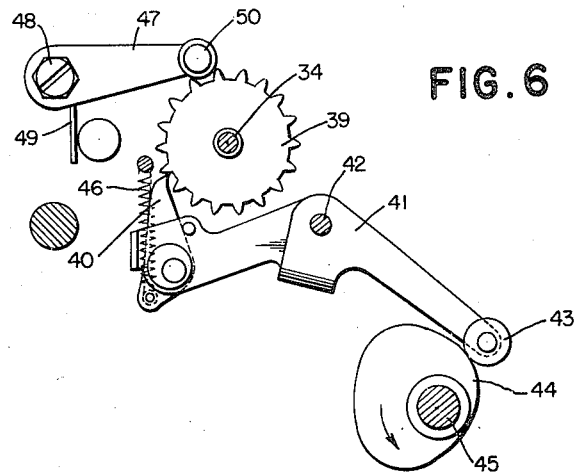
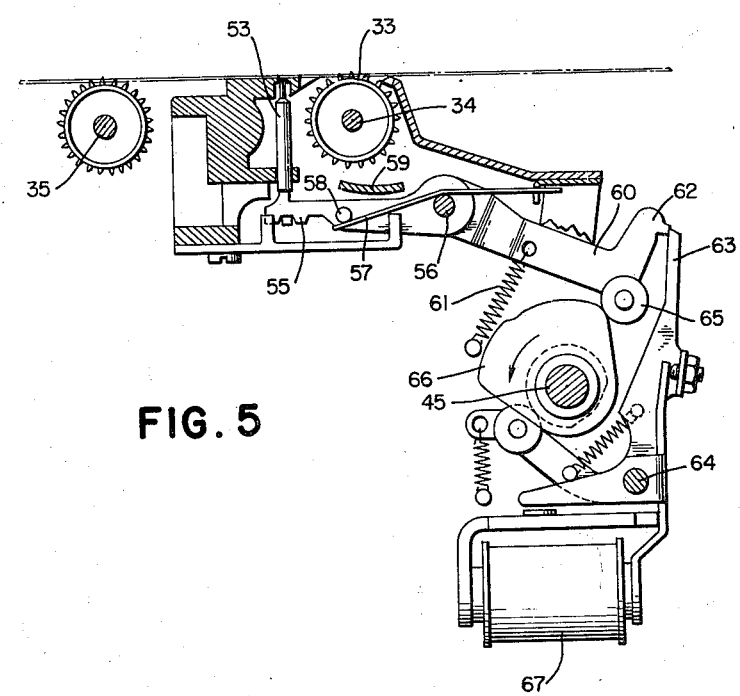

Sept. 22, 1959   E. O. BLODGETT ET AL   2,905,298
WRITING MACHINE
Filed Sept. 20, 1955   17 Sheets-Sheet 6

INVENTORS
EDWIN O. BLODGETT
WILBUR C. AHRNS
BY
ATTORNEY

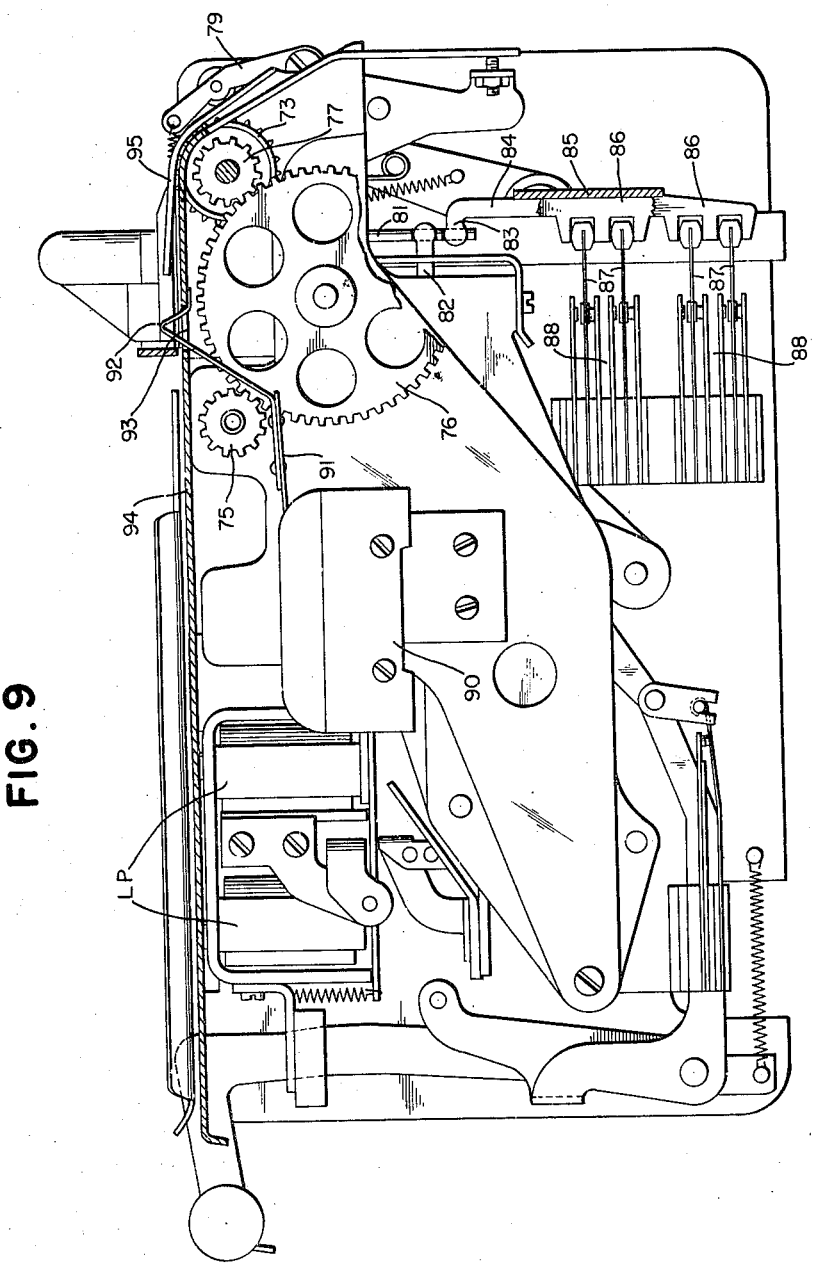

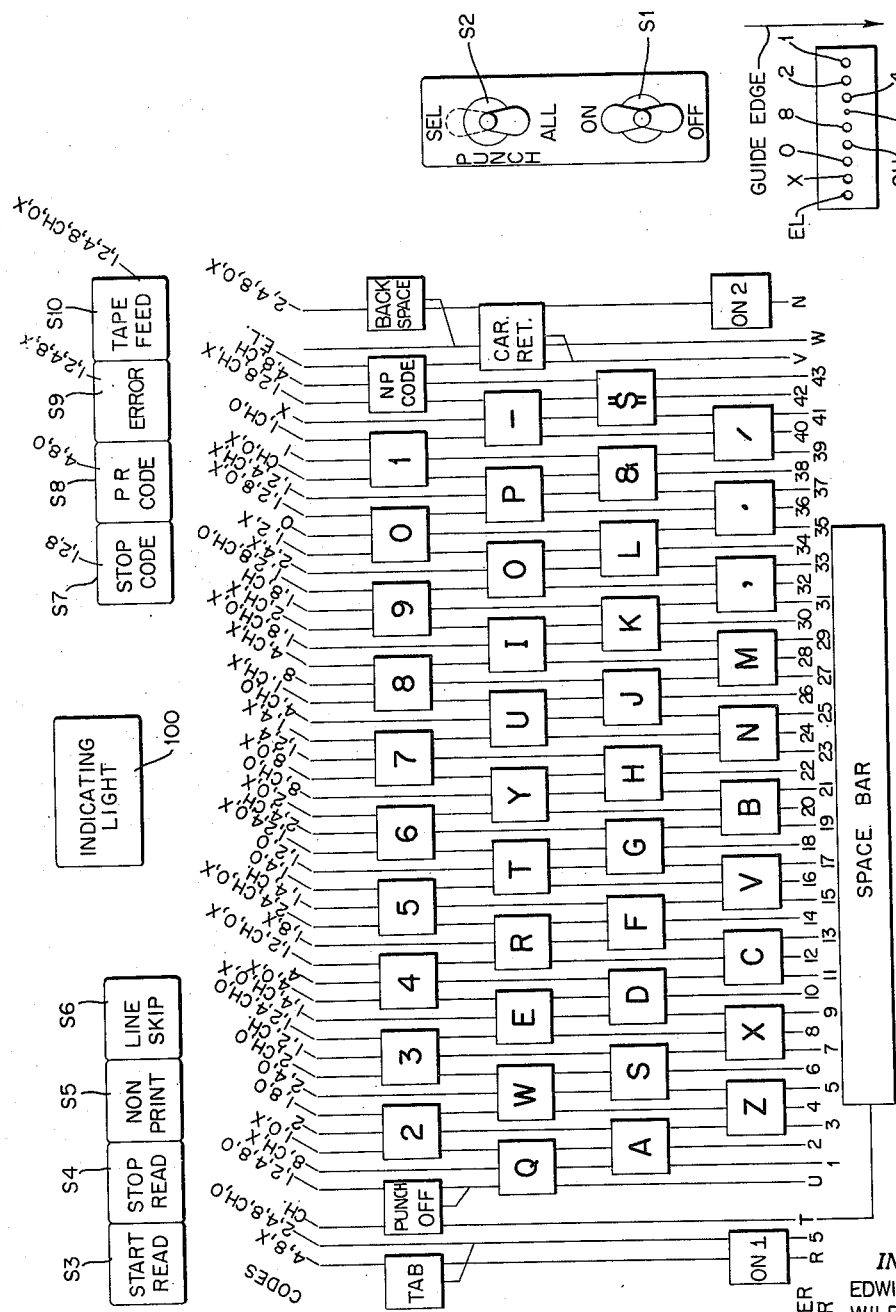

Sept. 22, 1959  E. O. BLODGETT ET AL  2,905,298
WRITING MACHINE
Filed Sept. 20, 1955  17 Sheets-Sheet 9

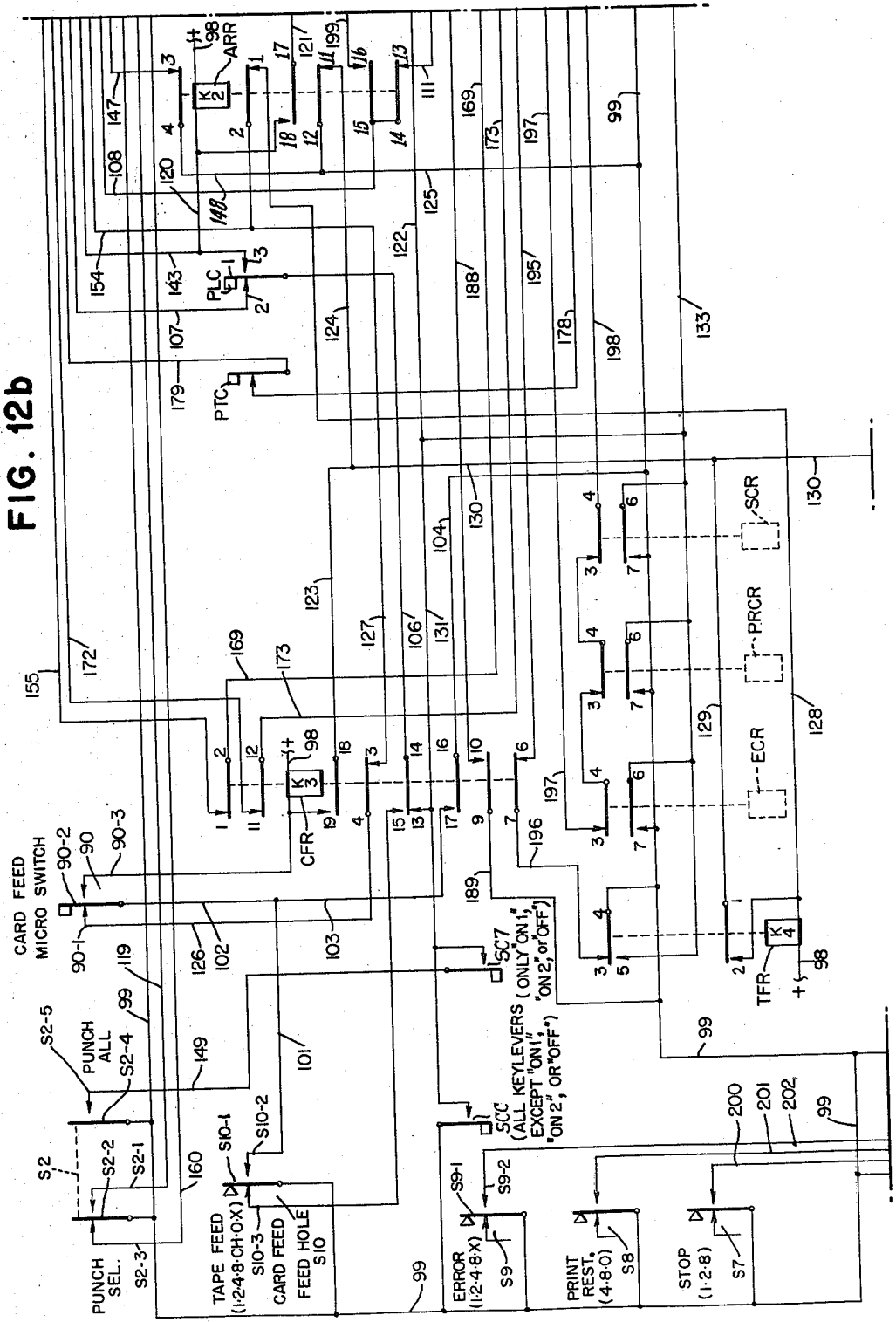

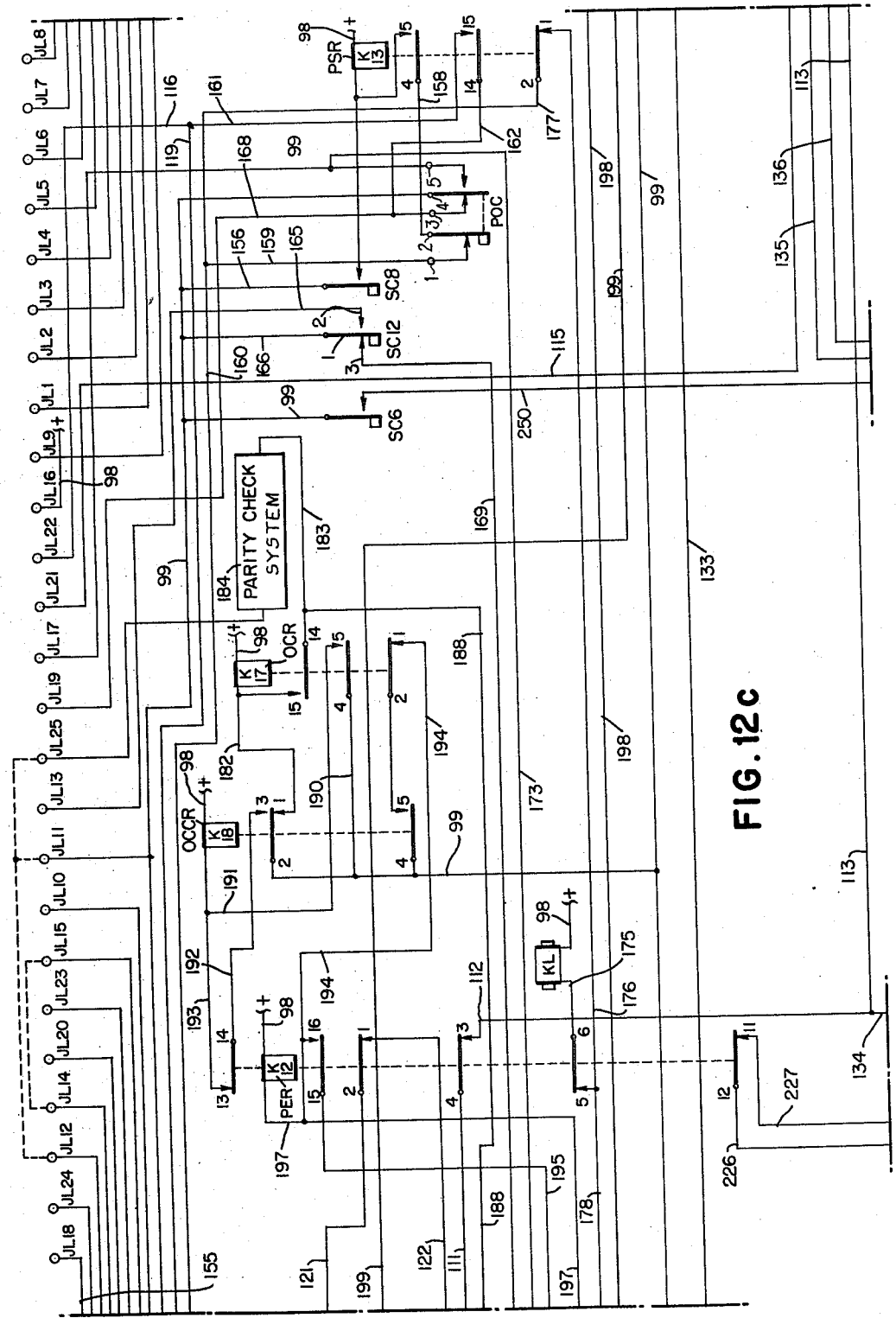

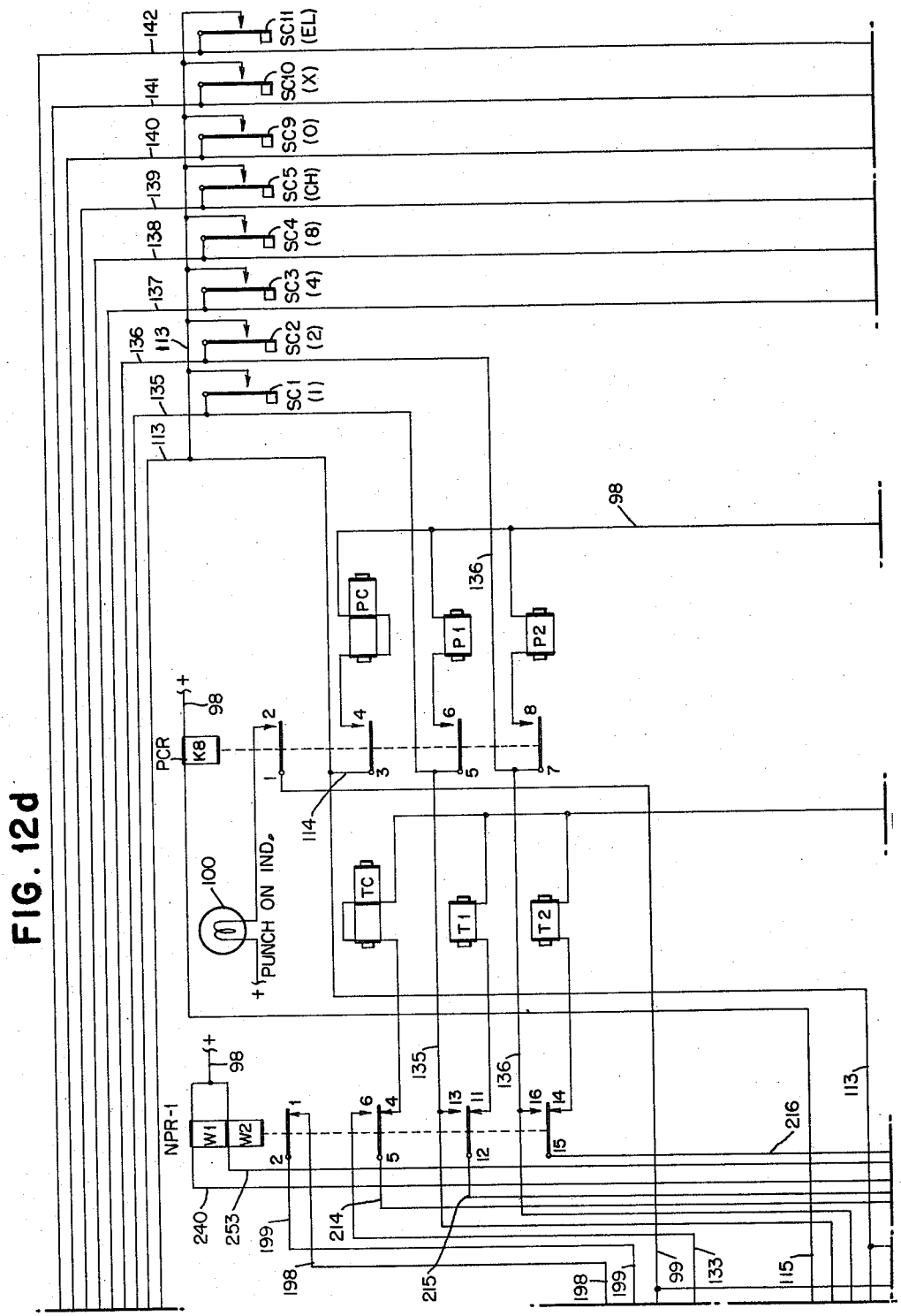

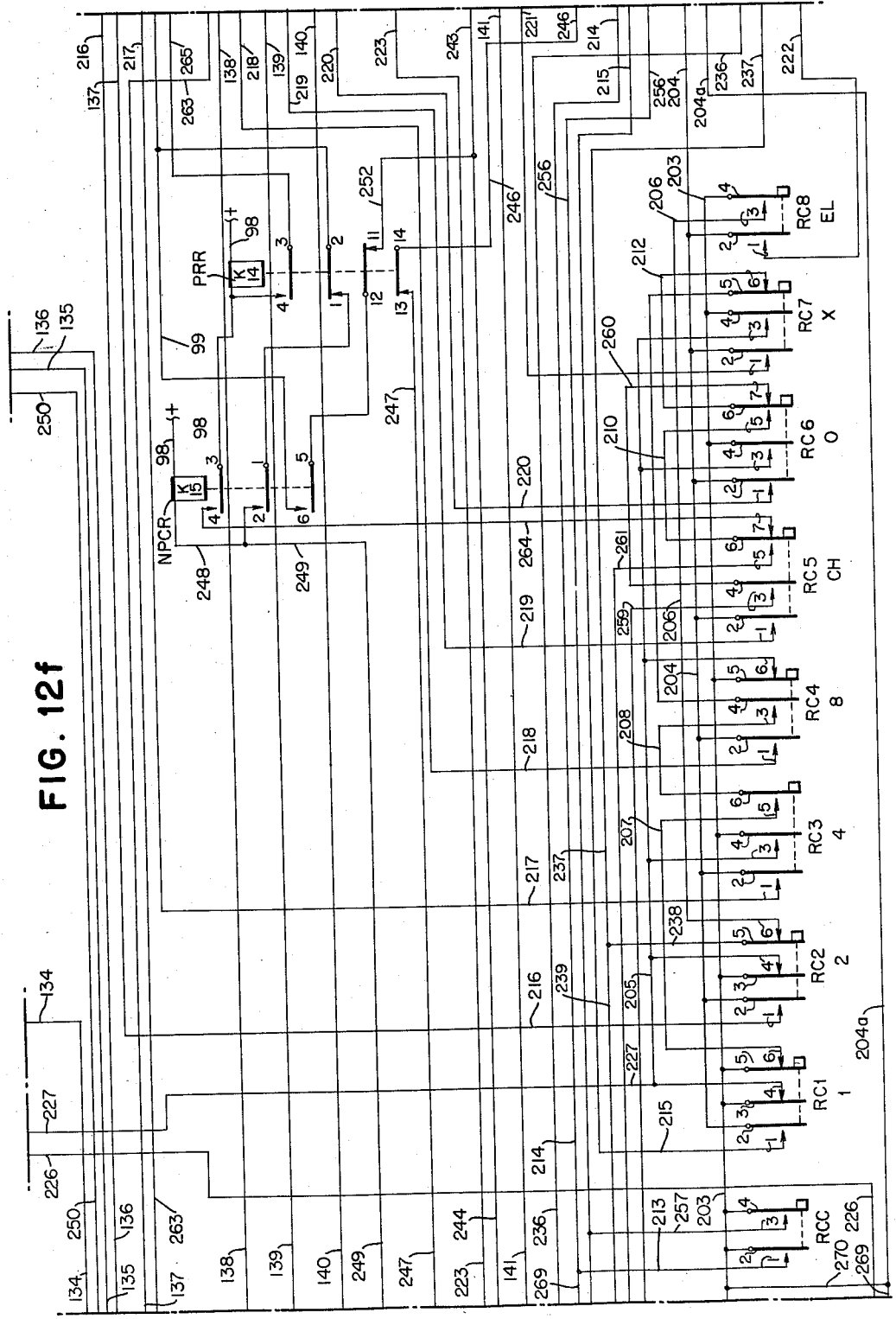

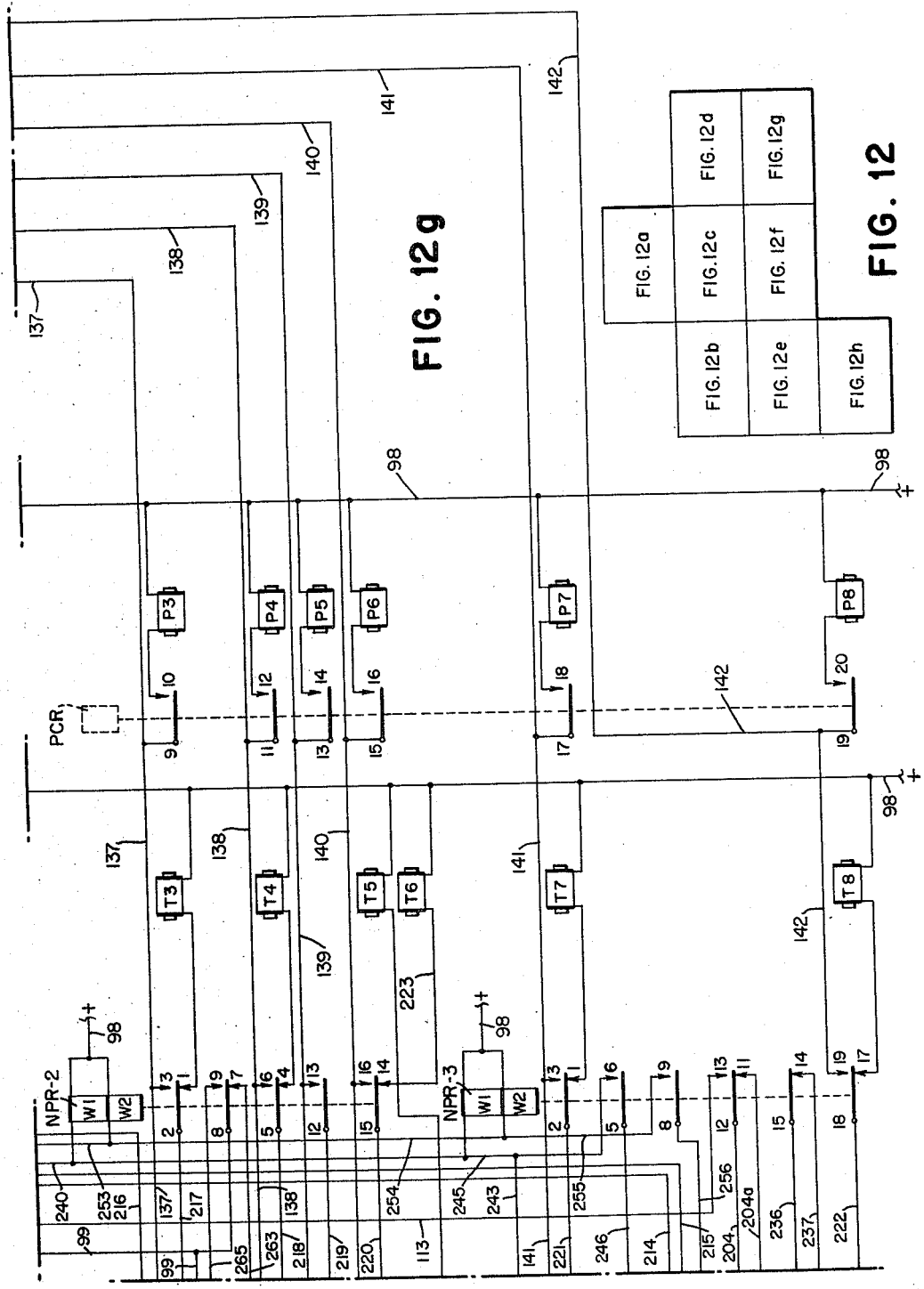

Sept. 22, 1959 E. O. BLODGETT ET AL 2,905,298
WRITING MACHINE
Filed Sept. 20, 1955 17 Sheets-Sheet 16

Sept. 22, 1959  E. O. BLODGETT ET AL  2,905,298
WRITING MACHINE
Filed Sept. 20, 1955  17 Sheets-Sheet 17

United States Patent Office 2,905,298
Patented Sept. 22, 1959

2,905,298

WRITING MACHINE

Edwin O. Blodgett and Wilbur C. Ahrns, Rochester, N.Y., assignors to Commercial Controls Corporation, Rochester, N.Y., a corporation of Delaware Application September 20, 1955, Serial No. 535,497

39 Claims. (Cl. 197—20)

The present invention relates to tape controlled writing machines and, particularly, to such machines in which a program control tape may be perforated in accordance with a preselected code and may then be used for automatic control of the writing machine in reproducing copy.

Tape controlled writing machines are in widespread use for preparing repetitive copy and, when extended to effect program control of the writing machine, to eliminate repetitive manual keyboarding operations and thereby reduce reproduction costs and chances of reproduction error. A tape controlled writing machine of this nature is the subject of United States Patent No. 2,700,446, granted January 25, 1955 to Edwin O. Blodgett. As there shown, manual operation of the writing machine key levers not only produces written copy but also causes actuation of a code selector by which each key lever may be identified by a preselected code. Functional control key levers are also identified by preselected codes whether such key lever is arranged to print or cause operation of a function only. The code employed is of the binary form in which the presence of a code bit is identified by the presence of an electrical potential and the absence of a code bit by the absence of such potential. These distinguishable binary codes produced in electrical form by operation of the writing machine are then used to control any device which can be operated by electrical code circuits, such as a tape punch used for the purpose of punching each character or functional code group in spaced relation into a tape. Such punched tape may then be used in a tape reading device to generate electrical code signals which are applied to a code translator. The latter responds to cooled electric pulses for mechanically selecting and operating both character and functional key levers of the writing machine to reproduce written copy conforming to the information recorded on the punched tape.

Tape controlled writing machines of the type last described provide very high speed and extreme accuracy in reproducing documents and in eliminating repetitive manual keyboarding operations. When use for programming purposes, the writing machine under control of the program tape moves a document form to the correct reproducing position and prints in repetitive or invariable information established by programming information. When the program operation calls for the writing machine to stop to receive variable information, the operator manually prints such information into the document form and presses a switch which causes the program tape again to take over and control automatically all printing and functional operations until the programming calls for the next fill-in of variable information. This combined program control and operator manipulation continues to the completion of the form document. Since both the automatic and operator control of the writing machine is by key lever actuation, the code selector of the machine is operative again to code information printed on the document form as well as all functional operations, and the resultant electric code signals may again be used to punch a second or byproduct tape in one operation.

There are many applications where, in using a controlled writing machine of the type described, only a small amount of information relates to a given subject and the number of subjects is large and the subjects are used in various selected sequences in writing any one document. It has been the practice to arrange unit record forms, each comprising a short length of conventional punched tape relating to each such subject, and to select and use these unit records one after another in the required selected sequences. A short length of punched tape of this nature is difficult to file, and there is no convenient way of identifying each record. Additionally, a short length of tape is not easily inserted and removed from the machine. Accordingly, it would be desirable to provide such unit records by punching them from heavier material, such as card stock, and to use a card stock width sufficient to provide ample room for unit record identification. Standard tabulating cards are widely used in present day business practices and would be desirable to provide unit records by using one or both edge portions of the card for code punching, a card then being handled and filed in accordance with standard practices. Where only one edge of a tabulating card is punched to provide the unit record desired, a major portion of the card may then be retained for punching and use with tabulating codes employed in many forms of business machines such as shown in the Lasker et al. Patent No. 2,323,816. Another type of such unit record cards can be in conventional folded fan form, a form which readily facilitates the preparation of successive unit records one after the other in essentially continuous manner after which the cards are separated into unit lengths or into multiples of such unit lengths for convenient handling and use as unit records.

There are many instances where a master program tape or card may be prepared with relation to a particular form document, but being of "generic" form must include only the invariable information common to all of a number of related types of program operations encountered in using the form document. However in preparing the form document for specific purposes or individuals, such as a specific customer or policy holder, much information which is variable insofar as the form document is concerned becomes invariable from one specific use or individual to another. Thus it is frequently desirable to reproduce in automatic manner by use of a master or generic program tape or card one or more like or dissimilar master or species tapes or cards and even to use the latter in producing one or more species or subspecies program tapes or cards in the nature of unit records each containing a maximum amount of invariable information for a specific use or individual.

It is an object of the present invention to provide a novel program controlled writing machine wherein a physical medium which provides machine program control may be duplicated in whole or in part either alone or concurrently with the reproduction of the medium-recorded information.

It is a further object of the invention to provide a novel arrangement and system for reproducing in automatic or semiautomatic manner, by use of a machine controlling program medium, one or more other machine controlling program media which may duplicate in whole or in part selectively as desired the recorded information of the first medium and which may also by desired selection be duplicates of each other or may contain only selectively recorded information not found in the first medium nor found in any other concurrently produced medium.

It is an additional object of the invention to provide a new and improved program controlled writing machine and system having novel functions, such as manually controlled skipping of one or more lines of information in a program tape or card otherwise reproduced, one suitable for use with punched program tapes or prepositionable edge-punched program cards or both as desired, one having manual and program controlled nonprint operations whereby selected information of a record medium may be passed over and not printed out, and other unique functions described hereinafter.

It is yet another object of the invention to provide a physical structure for prepositioning and specially coding edge-punched program cards to be read for program controlled operations and a card position sensing arrangement to indicate and control the terminal limit at which program and information recording should be completed on each such card or the last card of a fanfolded succession thereof.

It is a further object of the invention to provide a continuous parity check on program and data information recorded by punching a record medium to insure that each such record conforms to a pre-established code system and to terminate further recording in the event an erroneous departure from the preestablished code system is found to occur at any time.

Other objects and advantages of the invention will appear as the detailed description thereof proceeds in the light of the drawings forming a part of this application in which:

Figs. 2–7 illustrate a tape and card reader unit having novel features of construction;

Figs. 8 and 9 illustrate a tape and card punch unit having novel features of construction;

Fig. 10 illustrates a representative keyboard arrangement of a writing machine embodying the present invention, and Fig. 11 represents a form of punch code sequence used in the machine herein described;

Figure 12A:
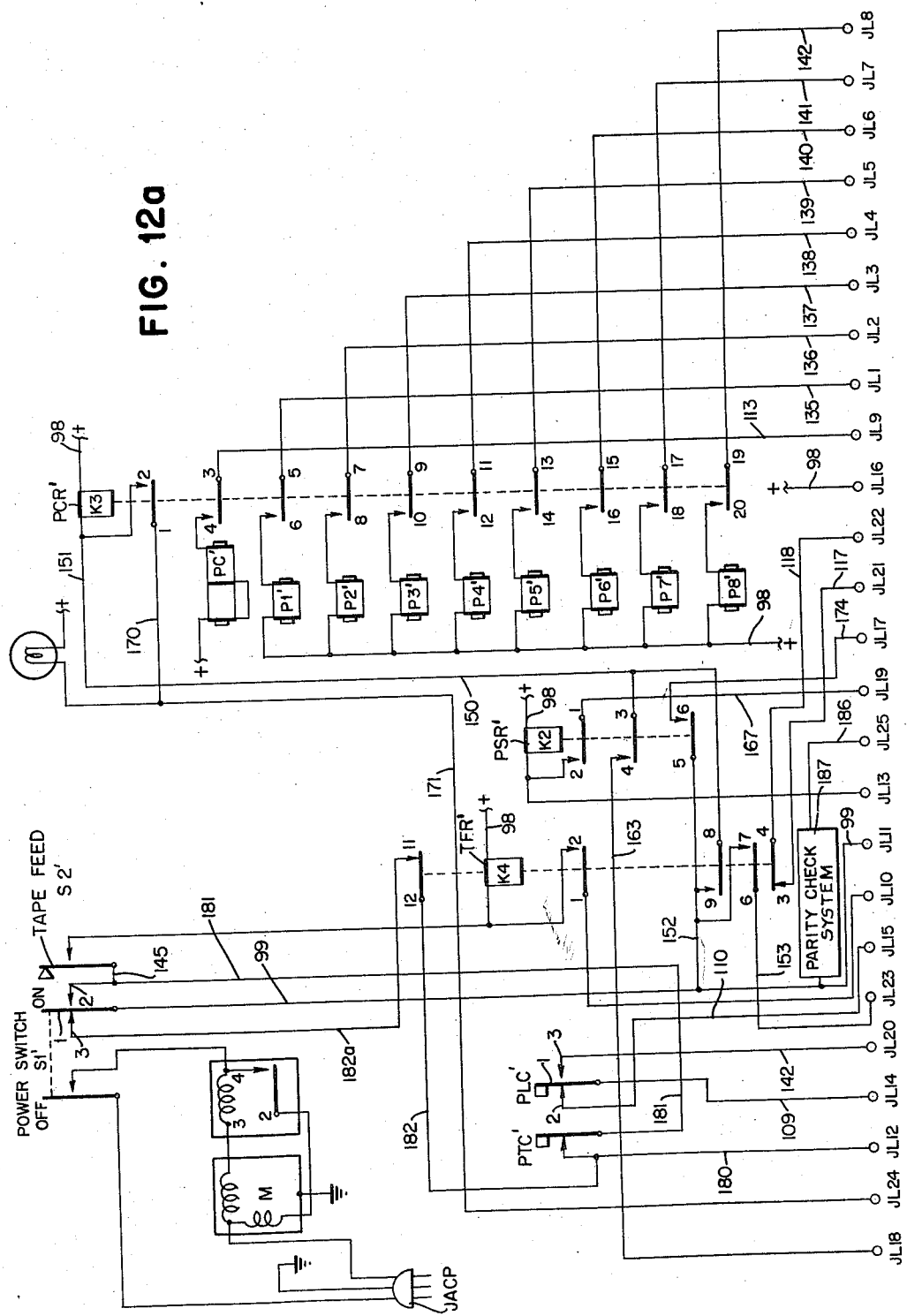
Figure 12E:
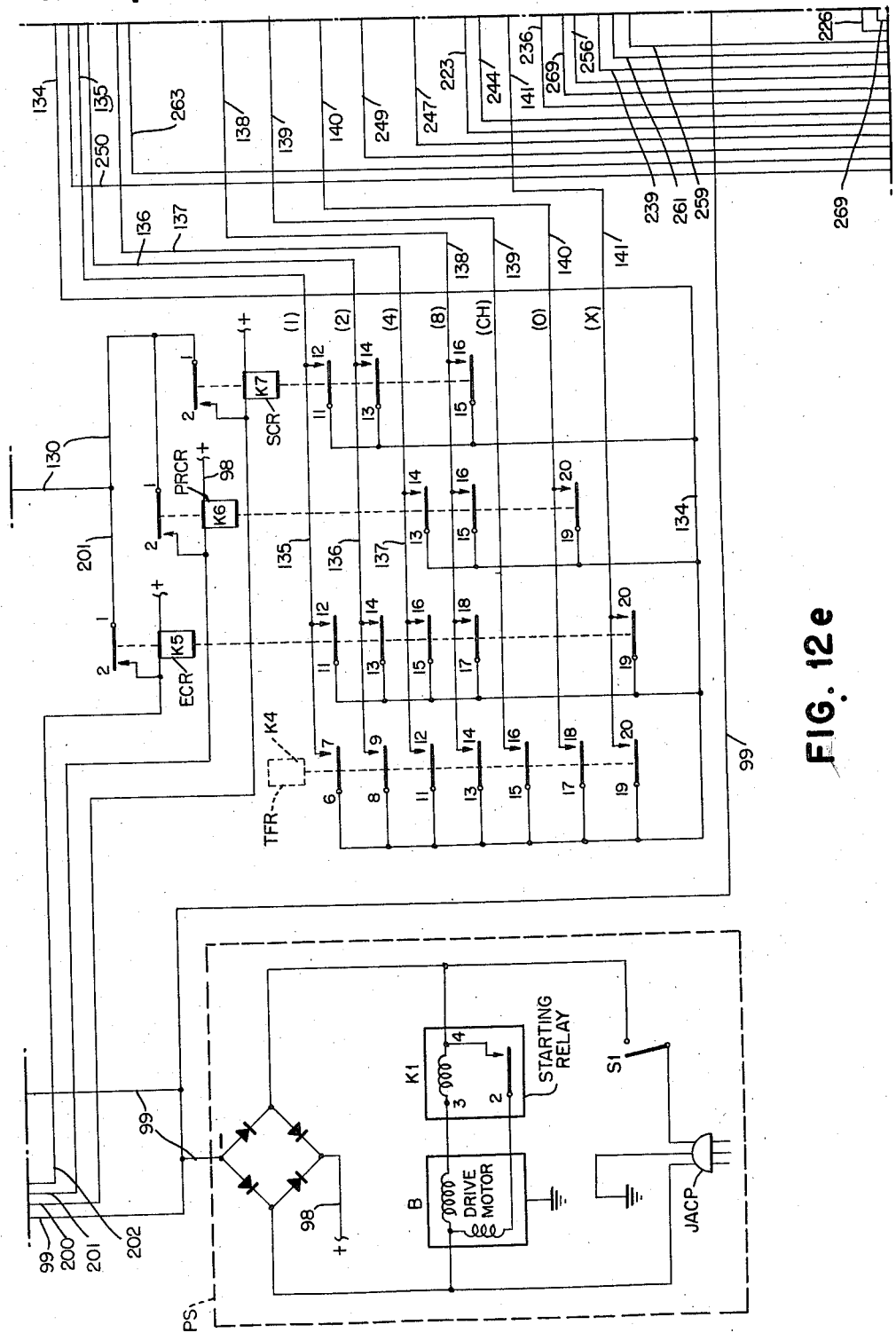
Figure 12H:
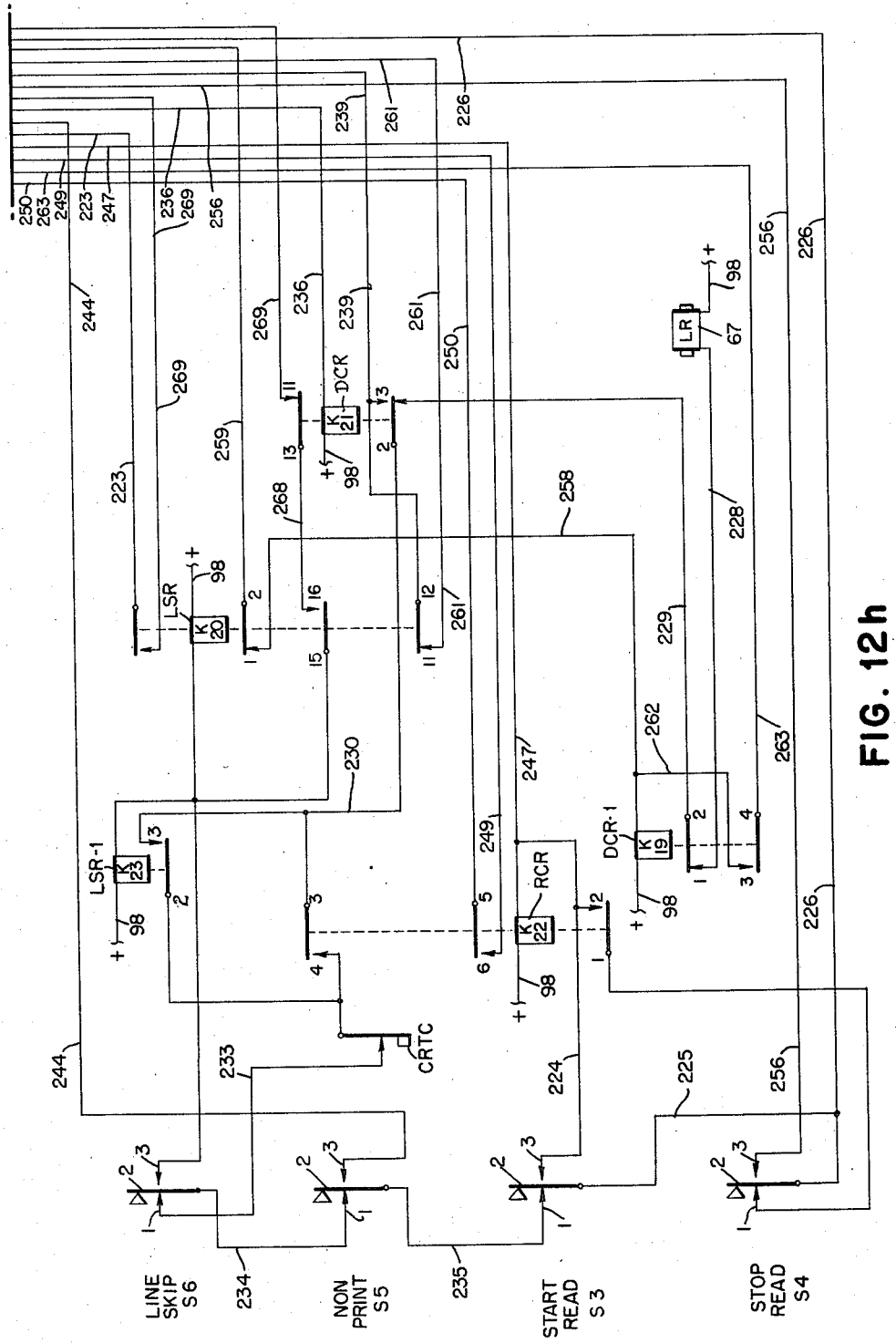
Figure 13:
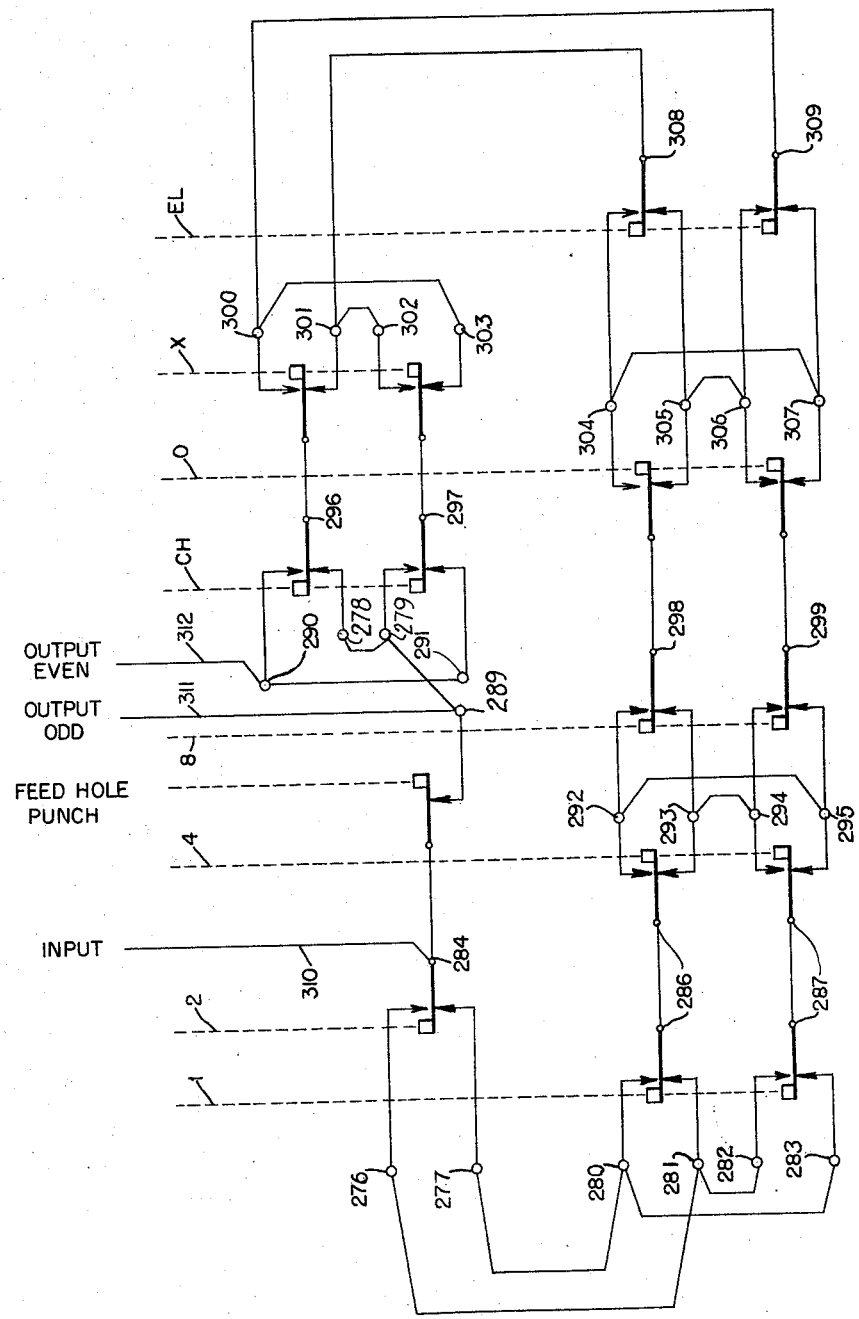

Figs. 12a–12h represent an electrical control circuit of a writing machine embodying the invention, and Fig. 12 shows the manner in which these several figures should be considered together as a composite system; and Fig. 13 represents the electrical circuit arrangement of a parity check contact system which forms a novel component of the punch unit and electrical control system employed in the writing machine.

GENERAL ORGANIZATION AND OPERATION

The writing machine and system disclosed herein is arranged to operate either manually or under control of a punched paper tape or edge-punched card. For convenience, reference hereinafter to punched tape will be understood to be a generic term applicable either to punched tape as such or to edge-punched cards or both.

While only certain machine constructional features will be herein disclosed and described, it will be understood that a writing machine embodying the present invention has a construction and operation in large part like that disclosed in the aforementioned Blodgett patent. In this, the machine is generally of the so-called electric typewriter form and includes a code selector, a code translator, a tape punch, a tape reader, and includes provision for the use of a remote tape punch if desired.

An important feature of a tape controlled writing machine and system embodying the present invention lies in the ability of a program tape, when used in the machine, automatically to select what portions of the program tape are to be recorded in one or more byproduct tapes which may be produced by a tape punch forming a component of the writing machine or by a tape punch remote from the machine but electrically connected by suitable control circuits thereto or by both the local and remote punch units. The program tape thus functions automatically to select any portion of the tape to be recorded into either or both byproduct tapes. To this end, a manual punch selection control for the tape punch operation is provided by a switch located on the writing machine at the right of the keyboard. When this punch selection switch is operated to the "all" position, the tape punch forming a component of the writing machine is always turned on, but the remote punch remains off unless it is turned on by actuation of the "on 2" key lever either manually or in response to an "on 2" code instruction recorded in a tape passing through the reader. The punch selection switch is normally in the "all" position in preparing a program tape, and is normally in its automatic selecting position "sel." where both the local and remote tape punches are automatically turned on and off by suitable codes in the program tape.

In operating the writing machine with this switch in its "all" position, all printing and functional control operations of the writing machine will be recorded in one tape whether these operations come from manual keyboarding or are automatic operations from a program tape. Thus an initial program tape or a composite byproduct tape may be produced. Either the initial program tape or a composite tape of the type last mentioned can then be read and used with the punch switch in its "sel." position selectively to punch into a selected one or both byproduct tapes only part of the recorded information recorded in the read tape and according to selective punch control codes. As will be explained more fully hereinafter, the punch switch codes such as "punch off," "on 1," and "on 2" are not punched into a byproduct tape except when the punch switch is in its "all" position. In this case, all of these punch switching codes are punched into the tape created by the No. 1 punch forming a component of the writing machine, and a punch "on 2" code read from the program tape will turn on the No. 2 remote tape punch but this code will not be punched into the tape created by the latter punch. However, while the No. 2 remote tape punch is turned on, all codes will be punched into the tape created by this punch.

Also incorporated into the writing machine and system embodying the present invention is a control enabling the writing machine to bypass certain operations of a tape read in the tape reader. This arrangement includes a manual switch called "nonprint" positioned in the control panel above the keyboard of the writing machine and a "nonprint" code key lever. When the manual switch is pressed and released the tape reader starts and continues to read the tape until it reaches the next stop code, and this phase of the reader operation does not cause the writing machine to print or otherwise operate. However, the information thus bypassed by the writing machine may, if desired, be punched into the byproduct tape created either or both by the No. 1 and No. 2 tape punches depending upon the control codes recorded in the read program tape. A nonprint code read from a program tape automatically effects the same operation as last described with the difference that a "print restore" code must be recorded in the program tape to terminate the nonprint operation, and intervening stop codes in the program tape are ineffective either to stop the reader or terminate the nonprint operation. In this instance the reader does not stop on reading the "print restore" code and the latter is effective to restore the normal reproducing control relation between the reader and the writing machine.

If a composite tape is placed in the reading unit of the writing machine and contains the proper punch switching codes plus stop codes preceding various items in the tape, the machine can for example perform the following functions when using a remote No. 2 tape punch in addition to a No. 1 punch forming a component of the machine. Any portion of the composite tape can operate the writing machine to print or not as specified by the absence or presence of nonprint code instructions, and any portions of the composite tape can be used to reperforate the information into either one or both byproduct tapes. When a stop code is read preceding an item, the operation of the writing machine ceases under control of the tape (unless the operation is an automatic nonprint one) and an operator can then manually operate the keyboard if required and thereafter press the "start read" switch to cause the writing machine once more to print under control of the composite tape. This manual and automatic printing operation of the writing machine can be punched into either one or both of the two byproduct tapes as desired. However, if the operator wishes to skip an item following a stop code, a "nonprint" switch is manually pressed so that the item is not printed but can be automatically punched into either or both of the byproduct tapes.

Thus two separate tapes can be automatically created, one containing information printed, the other containing information not printed, and both containing common information. The operation of selectively punching these two byproduct tapes by use of a program tape is entirely automatic and is determined primarily by the sequence of control codes in the program tape but can nevertheless be varied manually as suits a particular situation. For example, assume that the control codes preceding a given item comprise a "punch off" code, an "on 1" code, a "stop" code, a "punch off" code, and an "on 2" code. Information read from the program tape prior to the reader stopping and information inserted by manual key lever actuation thereafter would be punched only by the No. 1 punch automatically selected. Now if the operator presses the "nonprint" switch, the succeeding listed codes in the tape will be ineffective to select the No. 2 punch. This is because the writing machine key levers do not operate, by virtue of the nonprint manual instruction, and information continues to operate the No. 1 punch until a succeeding "stop" code is reached in the program tape or the reader operation is manually halted by actuation of the "stop" switch. On the other hand, if the operator elects to press only the "start read" switch, the writing machine key levers will be operated from the read tape so that the second "punch off" code will effect selection of the No. 2 punch only. From this it will be seen that the selective operation by the operator of either the "start read" or "nonprint" switches not only determines whether or not the following item in a program tape will be printed, but also determines in which one of two separate byproduct tapes the item of information will be recorded.

Whenever both punches are to be selected to record an item of information, the program tape will contain the "punch off" code followed by the codes "on 1" and "on 2" consecutively. When either or both are to be dropped out, a "punch off" code is used in the program tape. Thus where both punches have been selected and it is desired to drop out one only, the program tape contains a "punch off" code followed by an "on" code for the punch desired to be retained.

Provision is made in the present writing machine for punching information into, or reading information from, either tape or prepositioned unit record cards. In connection with the use of cards and since they are of fairly rigid stock and comprise master records requiring manual handling for each operation, edge-punching of the card from end to end usually unduly weakens the punched edge and causes it to tend to be somewhat fragile. Accordingly, provision is also made in the present writing machine for automatically converting from a punched delete code used with tape to a blank delete code for cards. Further, a card feed operation when manually selected automatically moves the card (with blank delete coding) from the last recorded information to the terminal limit at which information recording should be completed on each card. This leaves the maximum edge portion of card stock unpunched for purposes of protecting and rendering more rigid the punched card area. This automatic feed continues to a point where the next code will be correctly punched at the beginning of the next fanfold section when fan-fold cards are used.

In using program tape or card for preparation of form documents, a form may be used containing a sufficient number of lines for the maximum amount of entries even though only a few entries are made for a particular form preparation. A program tape or card must accordingly contain sections for each line of the form, and each section will usually contain several stop codes. The present writing machine includes provision to enable selective line skip under manual control, so that an entire section of the program tape or card corresponding to a particular line of the form may pass continuously through the reader without operating the writing machine when no entry is to be made in that line in the particular form document preparation. The program tape in this case is effective only to line space the form in preparation (using the carriage return code function for this purpose) to maintain synchronism between the form in preparation and the program tape.

The writing machine described herein also includes parity check provisions by which to insure that each punching operation conforms to a preestablished punch code system, and automatically to terminate further recording in the event of erroneous departure from the preestablished system so that malfunctioning of the punching operation is immediately detected and can be corrected and the erroneous recording of information thereby avoided.

Figure 1:
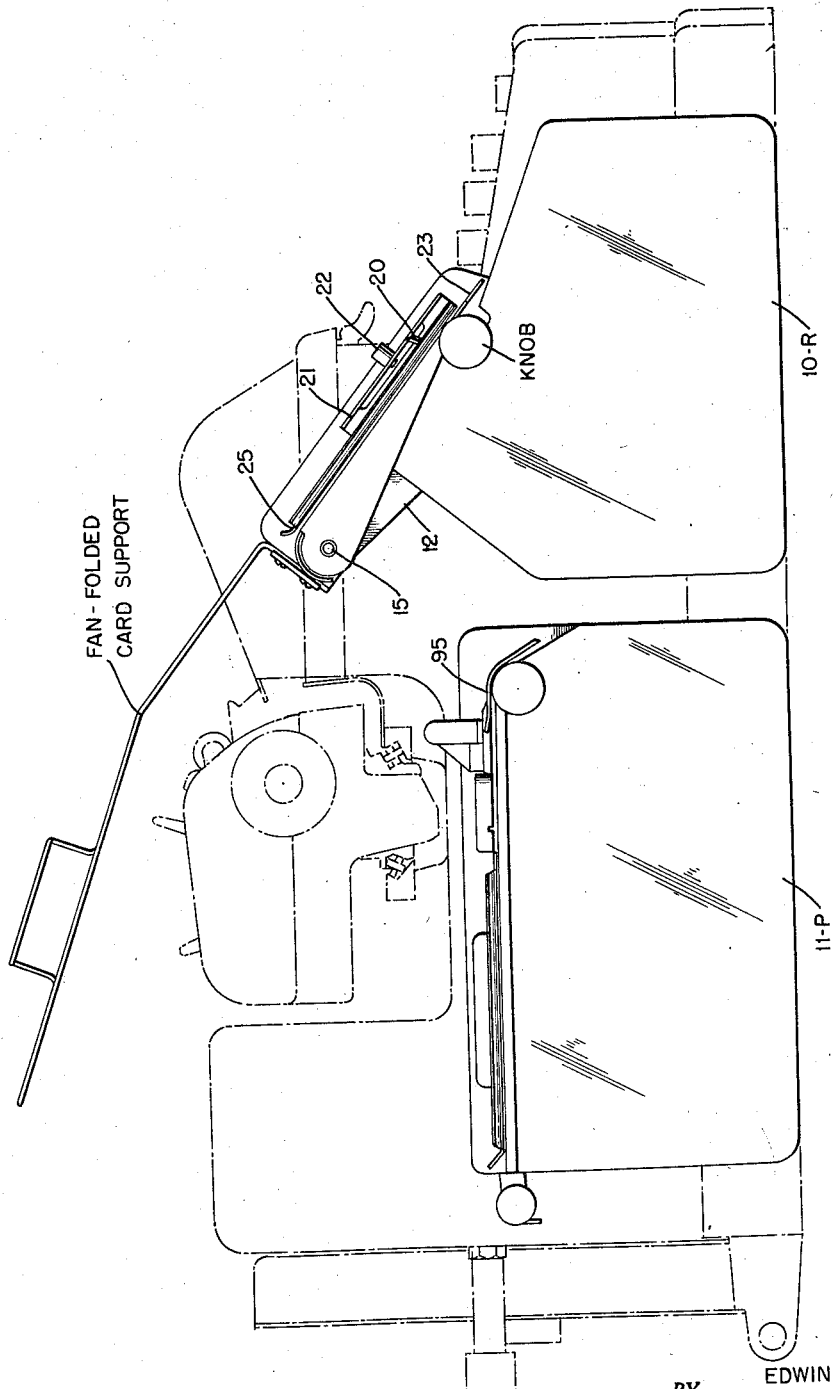
Fig. 1 illustrates in elevational side view the outline of a writing machine embodying the present invention and shows the relative positioning of novel reader and punch units forming components thereof.

An elevational outline illustration of a writing machine of the type shown in the aforementioned Blodgett patent but including novel tape reading and tape punching units forming components thereof is shown in Fig. 1 of the drawings. The tape or card reading unit 10–R and the tape or card punching unit 11–P here illustrated are shown as forming components of the writing machine and will now be described in detail.

CARD-TAPE READER

The card or tape reader 10–R of Fig. 1 has a construction shown in more detail in Figs. 3–7. It includes a base casting 11 and a subcasting 12 which together support the components of the reader unit. As shown more clearly in Figs. 2–4, the reader includes provision for reading either unit record punched cards or punched tape as desired. For this purpose, a plate 13 having an elongated card or tape engaging surface and flanged sides is supported at one end for limited angular movement by mechanical connection to a shaft 15 journaled in castings 11 and 12. The forward end of the plate 13 includes a depending arm 16 having a stud 17 engaged by one end of an over-center spring 18 which engages at its opposite end a stud 19 on the casting 12. The over-center spring 18 retains the plate 13 in the card or tape reading position shown in Fig. 2 or in an elevated card loading position, shown in Fig. 3, where the surface of the plate is engaged by a depending guide portion 20 of an overhanging arm 21 affixed to the casting 11. The rear end of the plate 13 has a curvilinear end portion over which punched tape moves when using this form of record medium, and the forward end of this plate includes a projecting portion 23 which may be manually grasped readily to move the plate 13 between its upper and lower pivotal positions.

Figure 4:
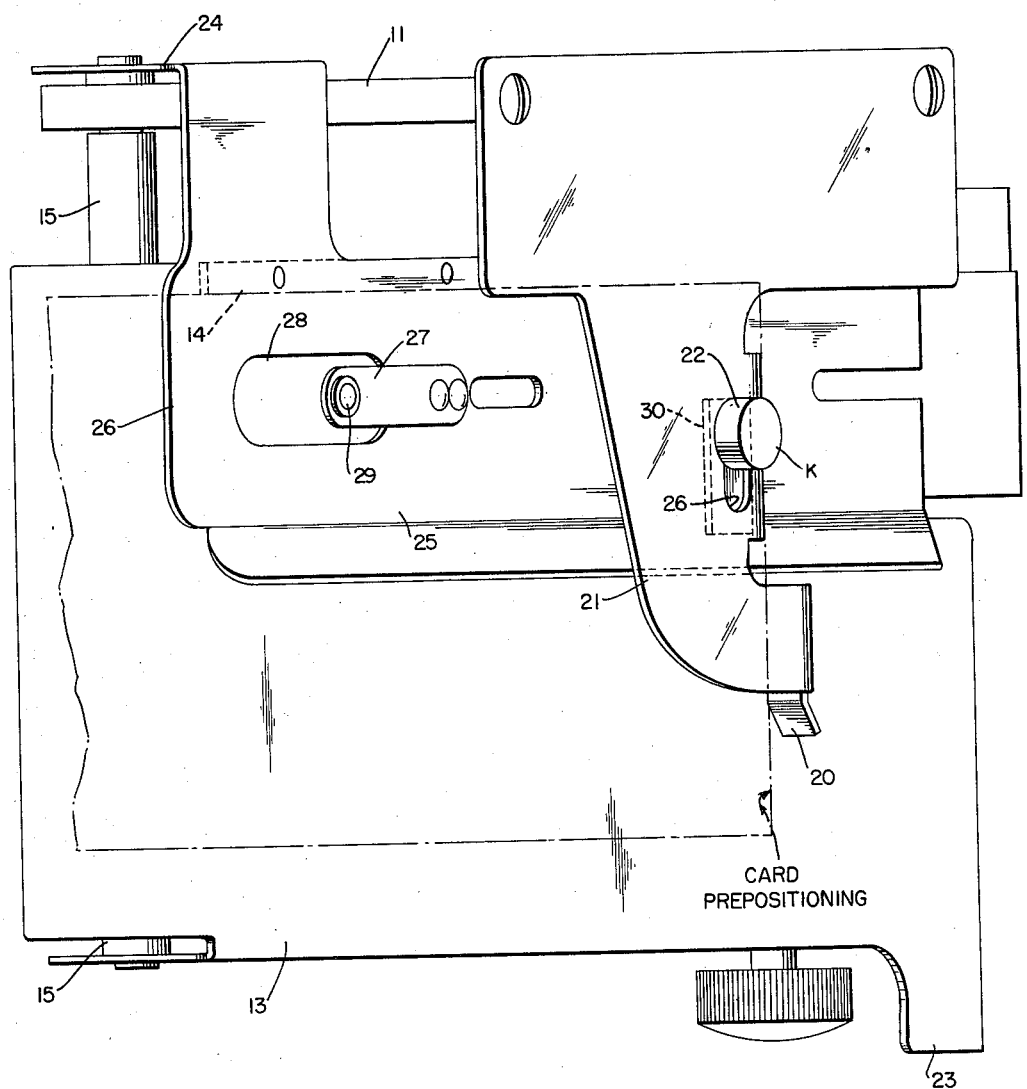

As shown more clearly in Fig. 4, the remote end of the shaft 15 has affixed thereto the depending arm 24 of an upper guide plate 25 having upturned rear and side portions. A tape or card locating spacer strip 14 is riveted between the plates 13 and 25, and the latter is fixedly supported by the shaft 15 to move in spaced relation to the plate 13 as the latter moves between its upper and lower pivotal positions. As thus arranged, the assembly comprised by the plates 13 and 25 is prepared to receive a punched card by moving the assembly to engage the plate 13 with the depending portion 20 of the fixed arm 21. A unit record punched card is now manually inserted between the plates 13 and 25, which are spaced to receive the card and retain it by frictional engagement. The card is aligned along its edge by engagement with the spacer or guide strip 14, and is positioned longitudinally by engagement of its end with the depending portion 20 of the stationary arm 21. After thus positioning the card, the assembly comprised by the plates 13 and 25 is then manually moved to the position shown in Fig. 2 where the card can move beneath the depending portion 20 and where longitudinally extended drive holes in the card are engaged by drive sprocket wheels of the reader unit. As shown in Fig. 4, a spring finger 27 fixed to the plate 25 extends through an aperture 28 of the latter and includes a ball point member 29 which engages the drive holes of the card to act as a form of light detent device to prevent displacement of the card during its movement from the depending portion 20 into driving engagement with both sprocket wheels of the reading unit.

For purposes of loading punched tape into the reading unit, a knob 22 has an integral stud portion extending through a slot 26 of the arm 21 and fixed to a bar 30 which is constrained for lateral movement by a downturned lip 31 provided on the arm 21. The knob 22 is positioned as shown in Fig. 4 when a card is loaded into the reader, but is moved to the opposite end of the slot 26 to load tape into the reader. In the latter position of the knob 22, the bar 30 is moved into engagement with the upturned side portion of the plate 25 and this causes the plate 13 in its loading position to be spaced a small distance from the depending portion 20 of the fixed arm 21. This small gap between the depending portion 20 and plate 13 permits a length of tape to be slipped sideways into tape reading position between the plates 13 and 25 into edge engagement with the locating guide 14 after which the plate assembly is moved to engage the sprocket drive wheels of the reading unit in the longitudinal drive holes of the tape.

The mechanical construction of the reading unit is essentially similar to the unit which is shown and described in detail in the aforementioned Blodgett patent and accordingly will only briefly be considered here. The construction shown in the patent includes a forwardly positioned sprocket drive wheel 33 (Fig. 7), and in the present construction a rearwardly positioned sprocket drive wheel has been added. Both sprocket wheels are similar in construction and are mounted upon respective shafts 34 and 35. A driving gear 36 is fixed to the shaft 34 and engages an idler gear 37 which in turn drivingly engages a gear 38 fixed to the shaft 35. The shaft 34 is driven by a ratchet wheel 39 (Fig. 6) fixed to the shaft 34, the ratchet wheel being engaged by a pawl 40 pivoted on one end of an arm 41 which itself is pivoted at 42 and carries at its opposite end a cam follower 43 arranged to engage a cam 44 fixed on a drive shaft 45 driven from the associated writing machine. The pawl 40 is biased by a spring 46 toward engagement with the ratchet wheel 39, to move the latter in step by step manner under control of the driven cam 44. The ratchet wheel 39 is retained in position after each drive step by a detent arm 47 pivoted at 48 and biased by a spring 49 to engage a roller 50 with the teeth of the ratchet wheel.

The reading of the punched holes in a punched tape or card is accomplished by a plurality of transversely spaced pins 53 (Fig. 5) corresponding in number to the number of holes used in the preselected punch code and aligned in spaced relation corresponding to the punched hole spacing. These pins are guided by a subcasting 54 and are pivotally connected at their bottom ends to respective arms 55 which are independently pivoted on a shaft 56 and are biased for clockwise rotation by a light spring 57 engaging a stud 58 on each arm. The arms 55 are restrained against clockwise rotation by a common bail 59 on the end of an arm 60 which is also pivoted on the shaft 56 and is biased for clockwise rotation by a spring 61. The arm 60 includes a notched end portion 62 which is engaged by a latch 63, pivoted at 64, when the arm 60 is rotated to its extreme counterclockwise position by a cam follower 65 supported on the arm in engaging relation with a cam 66 fixed on the driven shaft 45. A reading control magnet 67 moves the latch 63 to unlatched position during each reading interval, and this permits the arm 60 moving under control of the cam 66 to rotate clockwise once each reading cycle and thereby move its associated bail 59 out of engagement with the arms 55. This allows the reading pins 53 to move into engagement with the bottom surface of the punched tape or card or through corresponding punched holes in the latter. Thus the presence or absence of punched holes in the tape or card is sensed by the reading pins 53 once each reading cycle, a reading cycle being one revolution of shaft 45 during which the pins are moved into and out of engagement with the tape and the tape or card is subsequently indexed by the mechanism shown in Fig. 6.

Figure 2:
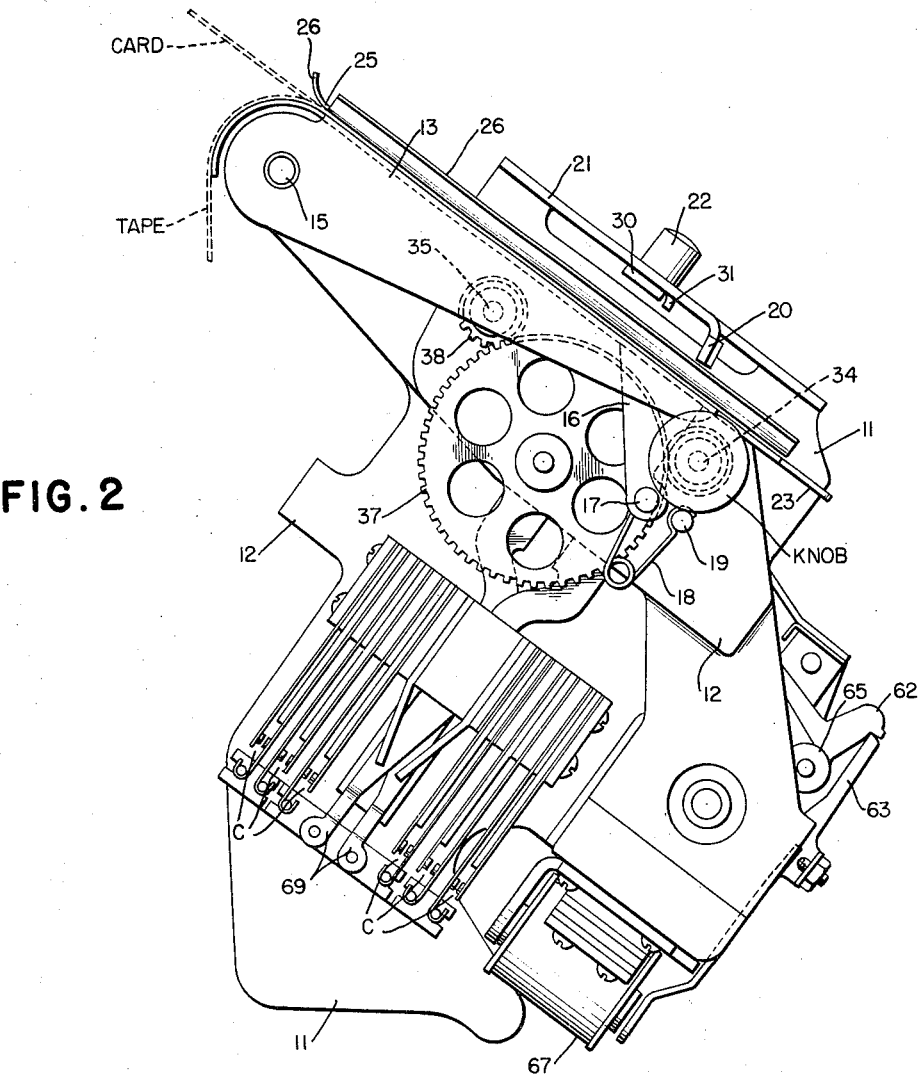
Figure 3:
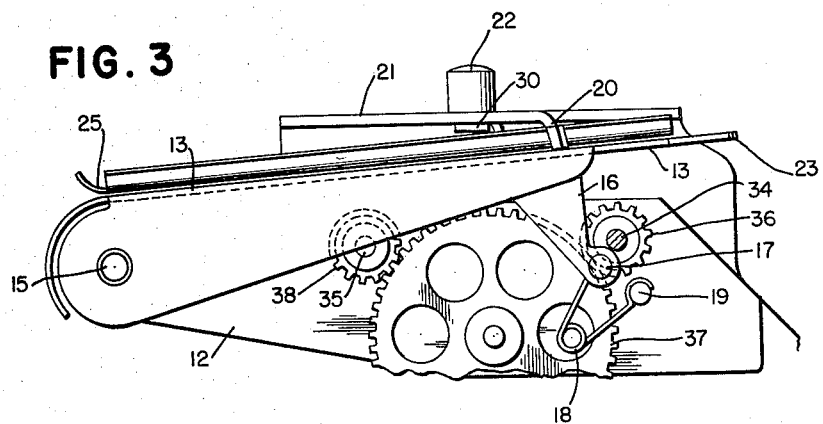
Figure 7:
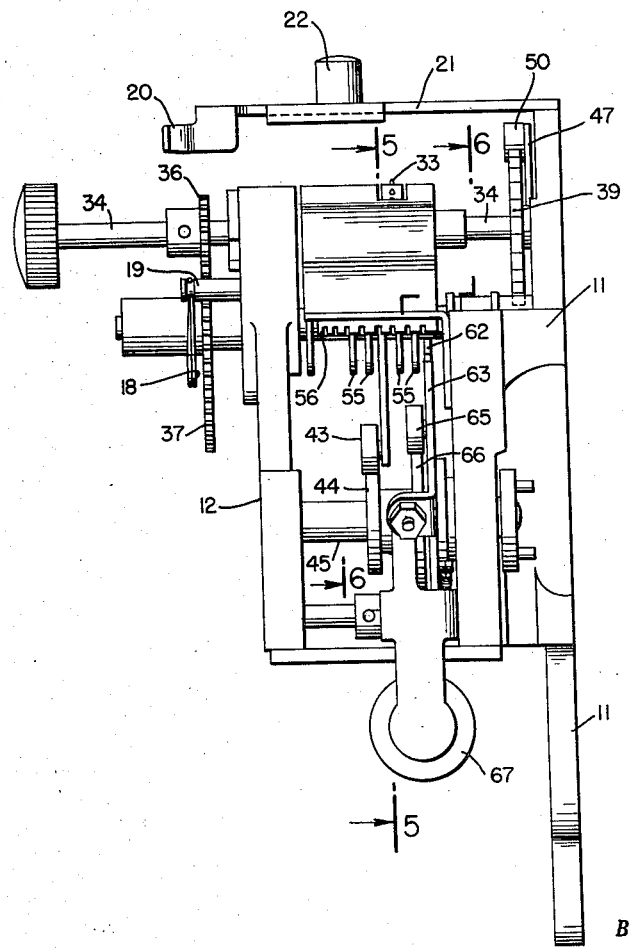

As shown more clearly in Fig. 2, and as described in greater detail in the aforementioned Blodgett patent, the reading unit includes a plurality of electric circuit contacts C arranged in contact groups and contact banks each controlled by one of the reading pins. It is explained in the Blodgett patent that each bank of contacts is normally maintained in a nonoperating position, with certain contacts of the bank closed and certain open, by operation of pivoted arms 69 individual to each bank. Each such arm is retained in nonoperated position by its associated arm 55 if the corresponding reading pin does not extend through a punched hole in a card or tape being read, but is movable to operative position (to open the normally closed contacts and close the normally open contacts of the bank) whenever the associated reading pin projects through a punched hole in the card or tape. The arms 69 are permitted to sense the position of the reading pins once during each reading cycle.

CARD-TAPE PUNCH

Figure 8:
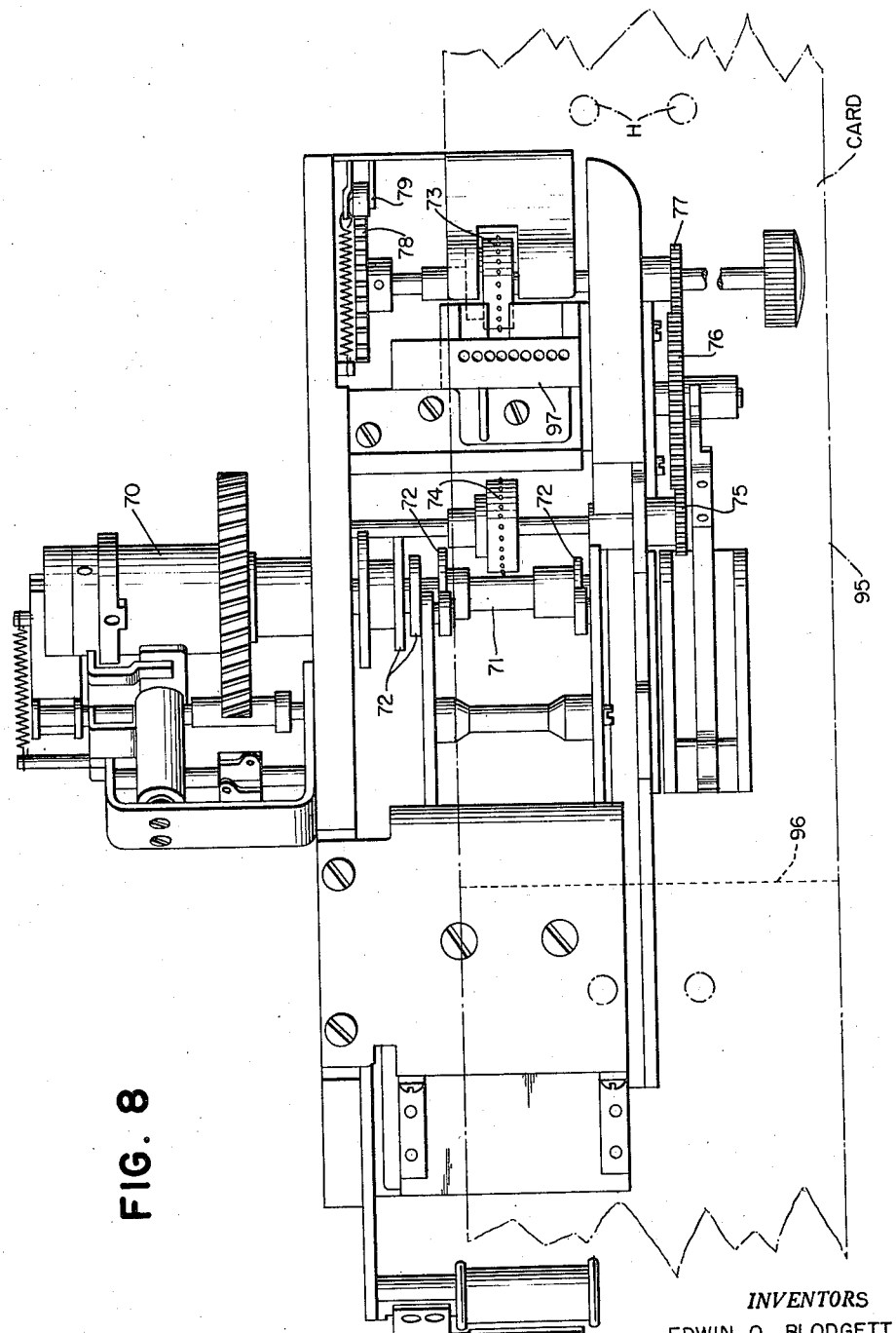

The construction of the card or tape punch is illustrated in Figs. 8 and 9. This construction, except for certain features hereinafter pointed out, is the same as that shown and described in the aforementioned Blodgett patent. Accordingly, corresponding components will merely be identified herein and reference should be made to the Blodgett patent for the detailed arrangement and operation of this punch unit. The unit is driven from the associated writing machine through a clutch 70, and the driven shaft 71 of the unit includes a number of cams 72 which are engaged by cam followers. The latter effect stepped movement of the card or tape, and also moved through selectively controlled interposers the several punch pins by which to effect code punching of the tape or card. The stepped drive mechanism is essentially similar to that employed in the reader unit described above and includes a forward sprocket drive wheel 73 which is shown in the Blodgett patent, and in the present construction a rear sprocket wheel 74 has been added. The two sprocket wheels are mechanically interconnected through gears 75, 76, and 77. Both sprocket wheels are operated and positioned by a ratchet wheel 78 and detent 79 mounted on the shaft of the forward sprocket wheel 73. The interposers are selectively controlled by individual punch magnets LP, and the lower ends of the punch pins 81 are arranged as shown in Fig. 9 to be moved by the ends of pivoted arms 82. The lower ends of each punch pin 81 is apertured to receive a hooked end 83 of an individual reciprocating contact actuator 84 which is guided for vertical reciprocatory movement by a comb and retaining plate 85 and includes a slotted lower end 86 for receiving the insulated portions of movable contacts 87 of ganged contacts 88. These contacts are included in a parity check contact system having an electrical circuit arrangement hereinafter shown and described, and serve the function of insuring that each punched code faithfully conforms to a preestablished code system.

It was mentioned above that, for reasons of enhanced strength, an edge-punched card preferably should not be punched to its extreme end. Accordingly, the present punch unit includes a micro-switch 90 (Fig. 9) having an operating arm 91 with a reentrant opposing feeler end portion 92 which projects through an aperture 93 of the card supporting and guiding surface 94 provided on the punch unit. As indicated in broken lines in Fig. 8, fan-folded cards 95 (having a score line 96 for ready separation into individual cards) are positioned to move past the punches and their associated punch die 97. The cards include holes H through which the end portion 92 of the micro-switch arm 91 may project when the succeeding card becomes so positioned that resumption of the punch operation initiates the unit record of such succeeding card. Pairs of holes H as shown in Fig. 8 are used when both edges of cards are to be punched. As will be explained hereinafter in connection with the electric control system, so long as the under surface of the card engages the feeler end 92 of the micro-switch arm 91 to maintain the end at the level of the guide plate 94, the contacts of the micro-switch 90 are closed and remain so until the arm 91 moves counterclockwise as the end 92 of the arm projects through a card aperture H. When this occurs, the punch operation automatically terminates and must be manually restarted. It will further be explained that the micro-switch 90 effects automatic feed of a unit record card from the last punch operation on it to the end of the card and at the same time automatically causes a conversion from a punch delete code used with tape to a blank delete code for use with cards.

While the card indicated in broken lines in Fig. 8 is shown for convenience of illustration as extending in planar fashion beyond the punch unit, in practice the end of the card is deflected by a guide 95 to pass downward between the punch and reader units positioned as shown in Fig. 1.

KEYBOARD ARRANGEMENT

The keyboard arrangement of the writing machine is shown in Fig. 10 wherein the function control key levers and character key levers are each identified by a numeral or a letter of the alphabet positioned at the bottom of the key lever. A representative code individual to each key lever is shown at the top of the latter. In addition, to the right of the keyboard is a power switch S1 and a punch control switch S2. Above the keyboard are certain manually operated switches identified as a "start read" switch S3, a "stop read" switch S4, a "nonprint" switch S5, and a "line skip" switch S6. Also positioned above the keyboard are four additional manually operated switches, which effect tape or card punching in accordance with an individual code shown in association with each switch, identified as a "stop" code switch S7, a "P.R. code" switch S8, an "error" code switch S9, and a "tape feed" (which might also be called "code delete") switch S10. An indicating light 100, centrally positioned above the keyboard, when illuminated furnishes an indication that the punch unit forming a component of the writing machine is energized in readiness to punch a No. 1 byproduct tape or card.

Four key levers meriting special mention are "punch off," "on 1," "on 2," and "nonprint" code. These key levers operate the code selector to effect punching of their individual codes into a tape, as will presently be more fully explained, but do not perform any printing or other functional control operation of the writing machine.

The illustrative code system shown in Fig. 10 is employed in a punched code sequence arranged as shown in Fig. 11. This code sequence usually extends across the full width of a punched tape, but occupies only an edge area of a unit record card.

ELECTRIC CONTROL SYSTEM

The electric control system for the writing machine, including the electric reading contacts of the reader unit and the punch magnets of the punch unit which form components of the machine, is shown in Figs. 12a–12h which should be considered together arranged as shown in Fig. 12. The electric control system for a remote punch unit, which is conveniently connected to the writing machine through a multi-conductor flexible cable, is shown in Fig. 12a which should be considered together as a unit and in operative relation to the electric control system of the writing machine as shown in Fig. 12.

It will be convenient to consider the electric control system according to the nature of each function which it performs.

*Card feed*

In using the writing machine, it is frequently desirable after completion of record punching on a card to feed the card (without further punching) on through the punch unit. For example, to provide such card feed by repetitive cycling of the punching unit, a feed switch S10 is manually operated to close its contacts S10–1 and S10–2 and thereby energize a card feed relay CFR. In this, the micro-switch 90 (referred to in connection with the punch unit of Fig. 9) will have its contacts 90–2 and 90–3 closed by the card positioned in the punch unit in readiness for punching.

Consider now in greater particularity the manner of card feed repetitively to cycle the punch unit from the last recorded information to the end-of-card hole H. This operation is automatic and continues to completion once the feed switch S10 is manually depressed and released. Upon manually depressing the switch S10, the relay CFR is energized from the positive terminal 98 of a power supply source PS through the contacts 90–2 and 90–3 of the micro-switch 90, conductors 101 and 102, and through the manually closed contacts S10–1 and S10–2 of the switch S10 to the negative terminal 99 of the supply source. Card feed relay CFR thereupon picks up and closes a hold circuit through the closed contacts 90—2 and 90—3 of the micro-switch 90, conductors 102 and 103, the now closed contacts 16 and 17 of the card feed relay CFR, and a conductor 104 to the negative terminal 99 of the power supply source. Now when the switch S10 is manually released to close its contacts S10–1 and S10–3, it conditions an energizing circuit for a punch clutch magnet PC.

This circuit is traced from the negative terminal 99 of the power source through the contacts S10–1 and S10–3 of the switch S10, a conductor 105, the now closed contacts 14 and 15 of the card feed relay CFR, a conductor 106, the normally closed contacts 1 and 2 of a punch latch contactor PLC, a conductor 107, a jumper conductor (shown in broken lines) to a conductor 108 if a remote punch unit is not employed (otherwise through a conductor 109 and the normally closed contacts 1 and 2 of a remote punch latch contactor PLC' and a conductor 110), the normally closed contacts 13 and 14 of an anti-repeat relay ARR, a conductor 111, the normally closed contacts 3 and 4 of a punch error relay PER, and conductors 112, 113 and 114 to the contact 3 of a punch control relay PCR. The punch control magnet PC is not energized, however, until the contacts 3 and 4 of the latter relay are closed by energizing the punch control relay PLR.

This is accomplished by manually moving the punch control switch S2 to its "punch all" position whereupon the punch control relay PCR is energized from the positive terminal 98 of the power source through a conductor 115 and a jumper indicated in broken lines to a conductor 116 (or through a remote punch unit conductor 117, the normally closed contacts 3 and 4 of a tape feed relay TFR', and a conductor 118), a conductor 119, and the now closed contacts S2–1 and S2–2 of the switch S2 to the negative terminal 99 of the power source. The energization of the card feed relay CFR, the punch control relay PCR, and the punch clutch magnet PC causes the local or No. 1 punch to complete a cycle of operation but only punch the feed hole in the card, since no punch magnets are energized at this time.

As the punch unit operates through its cycle, the punch latch control contact PLC moves to close its contacts 1 and 3 and thereupon energizes the anti-repeat relay ARR. The energizing circuit for the latter is traced from the positive terminal 98 of the power source, through a conductor 120, the closed contacts 1 and 3 of the punch latch contactor PLC, the conductor 106, the now closed contacts 14 and 15 of the card feed relay CFR, the conductor 105, and the contacts S10–1 and S10–3 of the feed switch S10 to the negative terminal 99 of the source. The punch control magnet PC is thereupon deenergized through the now open contacts 13 and 14 of the anti-repeat relay ARR. When the punch cycle is substantially completed, the punch latch contact PLC opens its contacts 1 and 3 to deenergize the anti-repeat relay ARR and closes its contacts 1 and 2 again to establish an energizing circuit for the punch clutch magnet PC. The anti-repeat relay ARR upon dropping out again completes through its contacts 13 and 14 the energizing circuit for the punch clutch magnet PC which thereupon initiates a second cycle of punch operation. This punch cycle again causes the anti-repeat relay ARR to be energized when the punch latch contact PLC closes its contacts 1 and 3; these again energize the anti-repeat relay ARR which deenergizes the punch clutch magnet PC as before. Once again the punch cycle causes the punch latch to open its contacts 1 and 3 and to close its contacts 1 and 2 to deenergize the anti-repeat relay ARR at the end of the punch cycle, and the latter relay upon dropping out again energizes the punch clutch magnet PC to initiate a third punch cycle of operation. These punch cycles thus occur automatically and repetitively until the micro-switch 90 is opened when the micro-switch feeler arm 91, 92 (Fig. 9) enters the end-of-card hole H at the punching station. The micro-switch 90 upon opening its contacts 90–2 and 90–3 now transfers the hold circuit for the card feed relay CFR through the contacts 18, 19 of the latter, a conductor 123, a conductor 124, the contacts 11 and 12 of the anti-repeat relay ARR, and a conductor 125 of the negative terminal 99 of the supply source. Thus when the anti-repeat relay ARR is once more energized during a punch cycle by the punch latch contact PLC, the card feed relay CFR is deenergized and opens its contacts 14 and 15 to prevent further energization of the punch clutch magnet PC thus to terminate the card feed.

*Tape feed*

When tape is placed in the punch unit, the tape does not actuate the micro-switch 90 so that the contacts 90–1 and 90–2 of the latter remain closed. Now when the tape feed switch S10 is manually actuated to close its contacts S10–1 and S10–2, a tape feed relay TFR is energized from the negative terminal 99 of the power supply, through the contacts last mentioned, the conductors 101 and 102, the contacts 90–1 and 90–2 of the micro-switch 90, a conductor 126, the normally closed contacts 3 and 4 of the card feed relay CFR, a conductor 127, the normally closed contacts 1 and 2 of the anti-repeat relay ARR, and a conductor 128 to the positive terminal 98 of the power supply. The tape feed relay upon picking up completes a holding circuit (through its contacts 1 and 2, a conductor 129, a conductor 130, the conductor 124, the contacts 11 and 12 of the anti-repeat relay ARR and the conductor 125 to the negative terminal 99 of the power source). This holding circuit prevents the tape feed relay from releasing until the punch cycle is completed after opening of switch S10. The tape feed operation provides repetitive "delete code" tape punching by maintaining the tape feed switch S10 manually depressed as long as tape feed is desired.

As with the card feed operation described above, the punch select switch S2 is moved to the "punch all" position to effect energization of the punch control relay PCR. There is the difference with tape feed, however, that the punch control magnet PC is now energized through the conductors 114, 113 and 112, the normally closed contacts 3 and 4 of the punch error relay PER, the conductor 111, the contacts 13 and 14 of the anti-repeat relay ARR, the conductor 108 and a jumper to the conductor 107 (or through the remote punch unit in the manner earlier explained), the contacts 1 and 2 of the punch latch control PLC, the conductor 106, contacts 13 and 14 of the card feed relay CFR, a plurality of conductors 131, 132 and 133 and the now closed contacts 4 and 5 of the tape feed relay TFR to the negative terminal 99 of the power supply PS. There is the further difference with tape feed that energization of the tape feed relay TFR causes it to close its pairs of contacts 6—20 and thus complete energizing circuits from the conductor 113 through a conductor 134 and a plurality of conductors 135—141 and respective pairs of contacts 5—18 of the punch control relay PCR to respective punch magnets P1—P7. Energization of these punch magnets cause a delete code 1—2—4—8—CH—O—X to be punched in the tape at each cycle of operation of the tape punch unit.

As long as the tape feed switch S10 is manually depressed, the tape feed relay TFR has its energization momentarily interrupted by opening of the contacts 1 and 2 of the anti-repeat relay ARR (and its holding circuit interrupted by the contacts 11 and 12 of the latter) each time the relay ARR is energized by closing of contacts 1 and 3 of the punch latch contact PLC during the punch cycle of operation. This energizing circuit is traced from the positive terminal 98 of the power source through the conductor 120, contacts 1 and 3 of the punch latch contact PLC, conductor 106, contacts 13 and 14 of the card feed relay CFR, conductors 131, 132 and 133, and the contacts 4, 5 of the tape feed relay TFR to the negative terminal 99 of the power source. To insure that the relay ARR holds up long enough to drop out the tape feed relay TFR, a hold circuit for the relay ARR is completed through its contacts 17 and 18, conductors 121, 122, 132 and 133, and the contacts 4 and 5 of the tape feed relay TFR to the negative terminal 99 of the power supply. With continued manual depression of the tape feed switch S10, the cycle of punch operation deenergizes the anti-repeat relay ARR by opening of the punch latch contact 1 and 3 (the hold circuit for relay ARR being opened by contacts 4 and 5 of the tape feed relay TER when the latter drops out). Closure of the contacts 1 and 2 of the relay ARR again energizes the tape feed relay TFR to initiate a second cycle of punch operation to punch the second delete hole sequence. This delete hole punching of the tape continues repetitively so long as the tape feed switch S10 is maintained manually depressed.

Manual tape feed of a remote punch unit is accomplishd in similar manner by depressing a tape feed switch S2' provided on the punch unit. With the power switch S1' of this unit in the "on" position, manual actuation of the tape feed switch S2' energizes a tape feed relay TFR' through an energizing circuit which may be traced from the positive terminal 98 of the power supply PS of the writing machine through a conductor 144 and the contacts of the switch S2', a conductor 145, and the contacts 1 and 2 of the power switch S1' to the negative terminal 99 of the power source. When the tape feed relay TFR' picks up, it completes a holding circuit through its contacts 1 and 2, a conductor 146 to a conductor 147 of the writing machine, through contacts 3 and 4 of the anti-repeat relay ARR, a conductor 148 and the conductor 125 to the negative terminal 99 of the power source. The tape feed relay TFR' upon picking up also closes its contacts 8 and 9 to complete an energizing circuit for the punch control relay PCR' through a conductor 150 and a conductor 151, the contacts 8 and 9 of the relay TFR', and a conductor 152 to the negative terminal 99 of the power source. The contacts 3 and 4 of the tape feed relay TFR' open to deenergize the punch control relay PCR of the writing machine should this relay be energized at this time. The contacts 6 and 7 of the tape feed relay TFR' close to connect the negative terminal 99 of the power source through the conductor 152, a conductor 153 a conductor 154, the contacts 1 and 2 of the anti-repeat relay ARR and the conductor 128 to energize the tape feed relay TFR of the writing machine. Energization of the latter relay does not effect tape feed of the writing machine, however, since the punch control relay PCR is deenergized at this time as earlier explained, but the energization of the relay TFR does complete through its contacts 1, 2 and 6—20 and the conductors 113 and 135—141 energization of the punch clutch magnet PC and energization of the punch magnets P1'—P7' to punch repetitive cycles of delete code holes in the tape of the remote punch unit. Repetition of the punch operation is effected as previously described with the punch latch contact PLC' of the remote unit now completing through its contacts 1 and 3 and conductors 142 and 143 an energizing circuit to control the operation of the anti-repeat relay ARR. Tape feed continues as long as the tape feed switch S2' is maintained depressed and the last complete punch operation is insured by the described holding circuit for the relay TFR' completed through its contacts 1 and 2 and controls 3 and 4 of the relay ARR.

*Keyboard actuated character and function-control code punching*

As explained more fully in the above-mentioned Blodgett patent, key lever actuation of the writing machine operates a code selector to effect closure of a plurality of contacts S1—SC11 in various code combinations each identifying an individual key lever. Assuming for the moment that the punch control relay PCR is energized, the contacts SC1—SC5 and SC9—SC11 complete energization of individual ones of the punch magnets P1—P8 through the contacts 3—20 of the relay PCR and a conductor 142 to the negative terminal of the power source traced as follows: from the conductor 142 through the conductors 113 and 112, the contacts 3 and 4 of the punch error relay PER, the conductor 111, the contacts 13 and 14 of the anti-repeat relay ARR, conductor 108 and the jumper to the conductor 107 (or through the remote punch unit conductor 110, the contacts 1 and 2 of the punch latch contact PLC', and a conductor 109), the contacts 1 and 2 of the punch latch contact PLC, the conductor 106, the contacts 13 and 14 of the card feed relay CFR, the conductor 131, and the contacts of a selector common contact SCC (actuated by all key levers except the key levers "on 1," "on 2," or "punch off") or a selector contact SC7 operated only by the key levers "on 1," "on 2" and "punch off." Note in this regard that the selector common contact SCC causes the punch magnets P1—P8 to be energized for all key levers except those mentioned whereas the selector contact SC7 causes the punch magnets P1—P8 to be energized only when any of the "on 1," "on 2," or "punch off" key levers are actuated and the punch selector control switch S2 is operated to its "punch all" position to connect the contact SC7 through a conductor 149 and the contacts S2–4 and S2–5 to the negative terminal 99 of the power source. The punch clutch magnet PC is energized through the contacts 3 and 4 of the punch control relay PCR with the punch magnets to initiate a cycle of punch unit operation. As with the tape feed operation described above, the punch clutch magnet PC and any energized punch magnet P1—P8 is momentarily deenergized at the end of the punch stroke when the anti-repeat relay ARR opens its contacts 13 and 14 upon becoming energized through contacts 1 and 3 of the clutch punch latch contact PLC, the conductor 106, the contacts 13 and 14 of the card feed relay CFR, and the selector common contact SCC or selector contact SC7.

If a remote punch unit is used and its punch control relay PCR' is assumed to be energized at this time, the selector contacts SC1—SC5 and SC9—SC11 also complete through the circuits 113, 135—141, and 143 and the contacts of the latter relay the energizing circuits for the punch control magnet PC' and the punch magnets P1'—P8' of the remote punch unit.

*Selective punch control*

Actuation of the key lever "on 1" operates through the code selector to close a contact SC8. This contact completes an energizing circuit from the negative terminal 99 of the power supply through a conductor 156 and a conductor 157 to a punch select relay PSR. The latter relay picks up and completes a hold circuit through its contacts 4 and 5, a conductor 158, contacts 1 and 2 of a punch off contactor POC, a conductor 159 and a conductor 160, and the contacts S2–2 and S2–3 of the punch selector switch S2 to the negative terminal 99 of the power source. The punch select relay PSR when it picks up also energizes the punch control relay PCR through an energizing circuit which may be traced from the latter relay through the conductor 115 and a jumper to the conductor 116 (or through the remote punch conductors 117 and 118 and the contacts 3 and 4 of the tape feed relay TFR'), a conductor 161, the contacts 14 and 15 of the punch select relay PSR, a conductor 162, and the contacts 3 and 4 of the punch off contact POC to the negative terminal 99 of the power source. Thus the No. 1 punch unit, forming a component of the writing machine, is conditioned to perform punching operations.

While this actuation of the key lever "on 1" effects energization of the punch select relay PSR and the punch control relay PCR as described neither it nor subsequent actuations of the "on 1" key lever cause a "No. 1" code punching in the No. 1 tape. This is because energization of the punch clutch magnet PC and punch magnets P1—P8 can only be effected through code selector contact SC7 as explained above, and even though the latter is operated through the code selector by the "on 1" key lever it can complete its energizing circuit to the negative terminal 99 of the power source only through the conductor 149 and the S2–4 and S2–5 contacts of the punch select switch S2 when the latter is positioned in its "punch all" position.

Actuation of the key lever "on 2" effects actuation through the code selector of the code selector contact SC12. The contacts 1 and 2 of the latter pick up the punch selector relay PSR' of the remote punch unit when used. The energizing circuit for this relay may be traced from the positive terminal 98 of the power source through a conductor 164 and a conductor 165 to the contacts 1 and 2 of the code selector contact SC12, and through a conductor 166 to the negative terminal 99 of the power source. The punch select relay PSR' picks up and its contacts 1 and 2 complete a holding circuit through a conductor 167, a conductor 168, and the normally closed contacts 3 and 4 of the punch off contact POC to the negative terminal 99 of the power source. The contacts 3 and 4 of the punch select relay PSR' energize the punch control relay PCR' of the remote punch unit through a circuit which may be traced from the positive terminal 98 of the power source, through the conductor 150, the contacts 3 and 4 of the punch selector relay PSR', a conductor 163 and a conductor 155 to the normally closed contacts 1 and 2 of the card feed relay CFR, and a conductor 169 and the normally closed contacts 1 and 3 of the code selector contact SC12 to the negative terminal 99 of the power source.

It will be noted in connection with the energization of the punch selector relay PSR' and the punch control relay PCR' by the code selector contact SC12 as just described that the former is energized when the code selector contact SC12 is operated to close its contacts 1 and 2, but the punch control relay PCR' is not energized until the code selector contact SC12 returns to its position of rest where its contacts 1 and 3 are closed. This delay in the energization of the punch control relay PCR' insures that the latter does not respond to any part of the "on 2" code which actuated the code selector contact SC12 to select the remote punch unit.

After the punch control relay PCR' picks up as described, its contacts 1 and 2 complete a holding circuit through a conductor 170, a conductor 171, a conductor 172, the normally closed contacts 11 and 12 of the card feed relay CFR, a conductor 173 and a conductor 174, the now closed contacts 5 and 6 of the remote punch select relay PSR', and the conductor 152 to the negative terminal 99 of the power source. Thus drop out of the remote punch select relay PSR' deenergizes through its contacts 5 and 6 the remote punch control relay PCR'.

It has been pointed out that neither the No. 1 punch unit, which forms a component of the writing machine, nor the No. 2 remote punch unit punches into its associated tape the punch select code which caused the punch selection so long as the punch select switch S2 is in the "punch select" position. This is likewise true for any subsequently occurring punch select codes for the reason that punch selection through the code selector contacts SC6 and SC12 by "on 1" and "on 2" key lever actuation also actuates the code selector contact SC7, but the latter cannot complete energization (through the conductor 149) of the punch clutch magnet PC or PC' and punch magnets P1—P8 or P1'—P8' of either the No. 1 or No. 2 punch units so long as the punch selector switch S2 is in the "punch select" position and thus maintains its contacts S2–4 and S2–5 open. In this, it will be recalled that the punch clutch magnet and punch magnets cannot be energized through the code selector common contact SCC which is not actuated by "on 1" or "on 2" key lever actuation.

It will be noted that the hold circuit for the punch select relay PSR extends through the normally closed contacts 1 and 2 of the punch off contact POC and that the hold circuit for the remote punch select relay PSR' extends through the normally closed contacts 3 and 4 of the punch off contact POC. Thus actuation of the "off" key lever will cause the punch off contact POC to drop out both punch select relays PSR and PSR', and these relays in turn will drop out their associated punch control relays PCR and PCR', relay PCR' being held up by a contact on the POC assembly until the contacts POC have returned to normal position and thereby insure that the "off" code will not be punched into the No. 2 tape. Accordingly, and as pointed out above, punch selection is effected by a "punch off" key lever actuation followed by an "on 1" or "on 2" or successive "on 1" and "on 2" key lever actuations.

Compare now the changed mode of operation from the punch selection modes above described when the punch select switch S2 is moved to its "punch all" position. The now closed contacts S2–1 and S2–2 of the punch select switch S2 complete an energizing circuit as earlier described to the punch control relay PCR to energize the latter. Further, the now closed contacts S2–4 and S2–5 of the punch selector switch S2 complete an energizing circuit also earlier described to the punch clutch magnet PC and punch magnets P1—P8 of the writing machine to energize these magnets by code selector actuation of the selector contacts SC1—SC5 and SC9—SC11 in accordance with actuation of any of the key levers "on 1," "on 2," and "punch off." Accordingly, the code selector switch S2 in its "punch all" position causes all punch selector codes to be punched in the No. 1 tape of the punch unit forming a component of the writing machine.

Now if the "on 2" key lever should be actuated to select the remote punch unit by actuation of the code selector contact SC12 in the manner above described, the remote punch selector relay PSR' and punch control relay PCR' are energized and any subsequent punch select codes are also punched in the No. 2 tapes of the remote punch unit by energization of the punch clutch magnet PC' and punch magnets P1'—P8' through the energizing circuits 113, 135—141, and 143 of the writing machine. Since the punch control relay PCR is now directly energized through the closed contacts S2–1 and S2–2 of the punch selector switch S2, and not through the punch select relay PSR, actuation of the punch off contact POC is now effective only to drop out the remote punch unit by deenergizing the remote punch relay PSR which in turn deenergizes the punch control relay PCR'. While the "on 2" punch code is not punched into the No. 2 tape of the remote punch unit as explained above, a subsequent "on 2" punch code, and the "punch off" code which effected actuation of the punch off contact POC, is punched into the No. 2 tape.

*Key lever lock up and parity check*

Whenever the writing machine is energized for operation, the key levers of the machine are unlocked by energization of a key lock magnet KL. The energizing circuit of the latter may be traced from the positive terminal 98 of the power supply through a conductor 175, the normally closed contacts 5 and 6 of a punch error relay PER, and through either of alternative circuits as follows: (1) through a conductor 176, the normally closed contacts 1 and 2 of the punch select relay PSR, a conductor 177, the conductor 160, and the closed contacts S2–2 and S2–3 of the punch select switch S2 in its "punch select" position; or (2) through a conductor 178, the punch tape contact PTC which is closed if either tape or a record card is positioned in the punch unit in readiness for punching, a conductor 179 and a jumper to the negative terminal 99 of the power source (or through a conductor 180 and either (a) the contacts PTC' closed by tape positioned in readiness for punching in the remote punch unit, and a conductor 181 and the contacts 1 and 2 of the power switch S1' in the "on" position to the negative terminal 99 of the power source, or (b) through a conductor 182, the contacts 11 and 12 of the tape feed relay TRF', a conductor 182a, and the closed contacts 1 and 3 of the power switch S1' in its "off" position to the negative terminal 99 of the power source). These alternative energizing circuits for the key lever lock up magnet KL permit key lever actuation whenever the punch selector switch S2 is in its "punch select" position and the punch select relay PSR is deenergized, but otherwise requires that tape be correctly positioned in the No. 1 punch unit in readiness for punching to close the punch tape contact PTC of the local or No. 1 unit (and also that either tape be positioned in a remote punch unit to close the punch tape contact PTC' and the power switch S2' be "on" or that the power switch S1' be in its "off" position).

The key levers become locked up under any condition which causes the punch error relay PER to become energized and thereby open its contacts 5 and 6 to deenergize the key lock magnet KL. The manner in which this may occur will now be considered.

An odd count relay OCR becomes energized, with energization of the writing machine, from the negative terminal 99 of the power source through the normally closed contacts 1 and 2 of an odd count control relay OCCR and a conductor 182. The odd count relay OCR upon picking up establishes a hold circuit through its contacts 14 and 15, a conductor 183, a parity check contact system 184 later to be described, a conductor 185, and a jumper to the negative terminal 99 of the power source (or through a conductor 186 and a parity check contact system 187 to the negative terminal of the power supply). An alternative hold circuit for the odd count relay OCR extends through its contacts 14 and 15, a conductor 188, the contacts 9 and 10 of the card feed relay CFR whenever the latter is energized, and a conductor 189 to the negative terminal 99 of the power supply. The latter hold circuit bypasses the parity check contact system 184 (and parity check contact system 187 of the remote punch unit) when feeding a card through the local or No. 1 punch unit at which time it will be recalled the card is fed and only the feed hole punched as explained above in connection with the card feed operation.

It is the purpose of the parity check contact system 184 (in series with the parity check contact system 187 of the remote punch unit when used) to insure that each punched code conforms to a preestablished code system or otherwise to interrupt the holding circuit of the odd count relay OCR and thereby terminate further operation should the parity check show an erroneous departure from the preestablished code system to have occurred at any time. In the system herein described, the punched code always includes an odd number of code bits and the parity check contact system maintains an uninterrupted electrical circuit through it if the actuated punch pins of the punch unit are odd in number. The electrical circuit of the parity system is interrupted, however, should only an even number of punch pins be actuated to their perforation position.

The odd count relay OCR upon picking up closes its contacts 4 and 5 to energize an odd count control relay OCCR through a conductor 190 and a conductor 191. The relay OCCR upon picking up establishes a hold circuit through its contacts 2 and 3, and conductor 192, the normally closed contacts 13 and 14 of the punch error relay PER and a conductor 193. At the same time, the odd count control relay OCCR opens its contacts 1 and 2 to interrupt the initial energizing circuit of the odd count relay OCR which thereafter must remain energized through its hold circuit described above. The contacts 4 and 5 of the relay OCCR prepare an energizing circuit through the contacts 1 and 2 of the odd count relay OCR and a conductor 194 for the punch error relay PER. This energizing circuit is not completed, however, until the odd count relay OCR becomes deenergized by interruption of the electrical circuit of the parity check contact system 184 (or the parity check contact system 187) due to an error in the punched code. With the odd count relay OCR so deenergized and its contacts 1 and 2 closed to energize the punch error relay PER, the latter establishes a hold circuit through its contacts 15 and 16, a conductor 195, the normally closed contacts 6 and 7 of the card feed relay CFR, a conductor 196, and the normally closed contacts 3 and 4 of the tape feed relay TFR to the negative terminal 99 of the power source.

Upon energization of the punch error relay, several events will occur. Key lever lock up caused by the open contacts 5 and 6 of the latter relay continues until the tape feed switch S10 is manually actuated to energize the tape feed relay TFR and thereby open the contacts 3 and 4 of the latter to interrupt the hold circuit of the punch error relay PER and cause this relay to drop out.

Thus a short interval of tape feed with accompanying delete-code punching is required to unlock the key levers of the writing machine. A second function of the punch error relay PER upon becoming energized is to open its contacts 13 and 14 and thereby interrupt the hold circuit for the odd count control relay OCCR which thereupon drops out and through its contacts 1 and 2 again enables energization of the odd count relay OCR which as before holds through it contacts 14 and 15 and the parity check contact system 184 (and 187 if used). The latter relay through its contacts 4 and 5 again energizes the odd count control relay OCCR which thereupon through its contacts 4 and 5 arranges that the punch error relay PER will again be energized through the contacts 1 and 2 of the odd count relay OCR if the latter fails to remain energized by a continuing open circuit in the parity check system 184 (or 184 and 187) after the punch error relay has been deenergized by a tape feed operation. The third function of the punch error relay PER when energized is to open its contacts 3 and 4 and thereby interrupt the energizing circuit for the punch clutch magnet PC and punch magnets P1—P8 of the writing machine (and punch clutch magnet PC' and punch magnets P1'—P8' of the remote punch unit). Lastly, the contacts 1 and 2 of the punch error relay PER serve to interrupt the hold circuit of the anti-repeat relay ARR (through the contacts 17 and 18 of the latter) and the selector common contact SCC.

*Anti-repeat control*

To prevent code punching error due to operator typing speed exceeding the rate of possible punch operation, an anti-repeat relay ARR is provided. If two key levers are actuated at a sufficiently high rate of speed as to prevent the selector common contact SCC from actually opening between the two key actuations, the anti-repeat relay ARR is energized from the negative terminal 99 of the power supply through the selector common contact SCC, the conductor 131, the normally closed contact 13 and 14 of the card feed relay CFR, the conductor 106, the punch latch contact PLC contacts 1 and 3, and the conductor 120 to the positive terminal 98 of the power supply. The anti-repeat relay ARR upon being thus energized holds up through its contacts 17 and 18, the conductor 121, the contacts 1 and 2 of the punch error relay PER, conductors 122 and 131, and the selector common contact SCC. The punch error relay PER is thereupon energized through a conductor 197, the normally closed contacts 3 and 4 of an error code relay ECR, the normally closed contacts 3 and 4 of a print restore code relay PRCR, the normally closed contacts 3 and 4 of a stop code relay SCR, a conductor 198, the normally closed contacts 1 and 2 of the nonprint relay NPR, a conductor 199, the now closed contacts 15 and 16 of the anti-repeat relay ARR, the conductor 108, a jumper to the conductor 107 (or the conductors 109 and 110 and the contacts 1 and 2 of the punch latch contact PLC' of a remote punch unit), the contacts 1 and 2 of the punch latch contact PLC, the conductor 106, the normally closed contacts 13 and 14 of the card feed relay, the conductor 131, and the selector common contact SCC to the negative terminal 99 of the power supply. The punch error relay PER upon picking up completes a hold circuit through its contacts 15 and 16, a conductor 195, contacts 6 and 7 of the card feed relay CFR, and the contacts 3 and 4 of the tape feed relay TFR. The punch error relay thereupon opens its contacts 5 and 6 to lock up the key levers by deenergization of the key lever lock magnet KL until unlocked by manual actuation of the tape feed switch S10 as earlier described. The punch error relay PER in picking up opens its contacts 1 and 2 to interrupt the hold circuit of the anti-repeat relay ARR which thereupon returns to its deenergized position.

Stop, print restore, and error coding

A stop code (1—2—8), a print restore code (4—8—0), and an error code (1—2—4—8—X), may be punched into the tape of the No. 1 or No. 2 or both punch units by manual actuation of respective keys S7, S8, and S9 which are positioned on the right hand side and above the keyboard of the writing machine as shown in Fig. 10. The switches S7, S8 and S9 directly energize respective control relays SCR, PRCR, and ECR through respective conductors 200, 201, and 202. The No. 1 and 2 contacts of each of these relays establishes a hold circuit for the relay through the contacts 11 and 12 and the anti-repeat relay ARR, and the contacts 6 and 7 of each relay establish an energizing circuit for the anti-repeat relay ARR through the contacts 13 and 14 of the card feed relay CFR and the punch latch contact PLC. The hold circuit for the anti-repeat relay ARR includes its contacts 17 and 18 and the contacts 1 and 2 of the punch error relay PER. It will accordingly be apparent from the energizing circuit arrangement just described that even momentary depression of any of the keys S7, S8 or S9 will cause one complete punch cycle of operation to punch the selected code, and only one such cycle will occur regardless of how long the key is maintained depressed because the relays ECR, PRCR and SCR are directly energized through their respective keys S9, S8, and S7. As shown in the drawings, the stop code relay SCR, the print restore code relay PRCR, and the error code relay ECR each include a plurality of contacts identified as contacts numbers 11 through 20 which upon energization of a selected relay effect selective energization of the conductors 135—141 and thereby of the punch magnets P1—P7 of the No. 1 punch or the corresponding punch magnets P1'—P7' of the No. 2 remote punch unit. The punch clutch magnet PC of the local No. 1 punch and the punch clutch magnet PC' of the remote No. 2 punch are energized in the same manner as described above in connection with the tape feed operation.

Tape reading operation

The tape reader unit described in connection with Figs. 2–7 includes a plurality of reader contacts RCC and RC1—RC8 actuated as explained above in connection with Fig. 2. The negative terminal 99 of the power supply is connected to a conductor 203 which is common to selected ones of the switch points of the reader control contacts RCC and RC1—RC8 as shown. Conductors 204—212 interconnect the switch points of the reader contacts RC1—RC8 as shown. Conductors 213 and 214 connect the No. 1 switch point of the reader common contact RCC through the contacts 4 and 5 of the nonprint relay NPR to a translator clutch magnet TC. Conductors 215—218 connect the No. 1 switch point of the respective reader contacts RC1—RC4 through individual pairs of contacts of the nonprint relay NPR and through individual pairs of contacts of a second nonprint relay NPR-1 as indicated to respective translator magnets T1—T4, while conductors 220—222 connect the No. 1 switch points of the respective reader contacts RC5—RC8 through contacts of the nonprint relay NPR-1 and through contacts to a third nonprint relay NPR-3 as indicated to respective translator magnets T6—T8. The energizing circuit for all of the magnets is completed through the associated No. 2 switch point of each reader contact, the conductor 204 normally closed contacts 11 and 12 of the nonprint relay NPR-3, the conductor 204a, and a conductor 270 to the negative terminal 99 of the power source.

As more fully explained in the above mentioned Blodgett patent, the reader contacts RCC and RC1—RC8 are actuated concurrently in accordance with various code punching of the read tape and effect corresponding energizations of the translator clutch magnet TC and the translator magnets T1—T4 and T6—T8 of the writing machine. Energization of the translator clutch magnet and translator magnets effect through a mechanical translator, shown and described in the Blodgett patent, selective actuations of the character and functional key levers of the writing machine to effect reproduction of recorded information read from the tape. The selective key lever actuations last mentioned operate (in the same manner as manual key lever actuations) through the code selector of the writing machine to actuate the code selector contacts SC1—SC12 which in turn provide selective code energizations of the punch clutch magnet PC and punch magnets P1—P8 of the local No. 1 punch (and corresponding magnets P1'—P8' of the remote No. 2 punch) as described above. It is the purpose of the nonprint relays NPR, NPR-1 and NPR-3 when energized to cause the reader contacts RCC and RC1—RC8 directly to energize the punch clutch magnet PC and punch magnets P1—P8 of the No. 1 punch (and through conductors 113 and 135—143 the punch clutch magnet PC' and punch magnets P1'—P8' of the remote No. 2 punch unit) so that byproduct tapes are produced from the read tape without reproducing the information by the writing machine.

The translator magnet T5 when energized in a manner presently to be explained prevents actuation of all key levers except the carriage return key lever. Accordingly, the No. 1 switch point of the reader contact RC5 may energize the punch magnet P5 through contacts 13 and 14 of the punch control relay PCR and contacts 12 and 13 of the nonprint relay NPR-1 so that the space bar code CH may be punched into a byproduct tape, but this reader contact does not energize the translator magnet T5. The latter receives its energization through a conductor 223 and the contacts 13 and 14 of a line skip relay LSR (when energized) in common with energization through conductor 214 of the translator clutch magnet TC by the reader common contact RCC so that all key levers except the carriage return key lever are prevented from operating each reader cycle of a line skip operation described hereinafter.

Start read operation

The reader unit is placed in operation by manually depressing a "start read" switch S3 which energizes a reader control relay RCR. The energizing circuit for the latter may be traced from the positive terminal 98 of the power supply through a conductor 224, the contacts 2 and 3 of the start read switch S3, a conductor 225, a conductor 226, the contacts 11 and 12 of the punch error relay PER, a conductor 227, the normally closed switch points 3 and 4 of either the reader contact RC1 or RC2 or the switch points 5 and 6 of the reader contact RC4, and a conductor 203, to the negative terminal 99 of the power supply. In connection with the energizing circuit last traced, it may be noted that a negative potential is always impressed upon the conductor 226 and any unactuated one of the reader contacts RC1, RC2 or RC4 (these contacts representing the stop code 1—2—8) in the absence of energization of the punch error relay PER (its contacts 11 and 12). The reader control relay RCR upon picking up establishes a hold circuit through its contacts 1 and 2 which are connected through the normally closed contacts 1 and 2 of a stop read switch S4 in parallel with the contacts 1 and 2 of the start read switch S3 so that the reader control relay RCR remains energized when the start read switch S3 is released.

The reader control magnet 67 is now energized from the positive terminal 98 of the power supply through a conductor 228, the normally closed contacts 1 and 2 of a nonprint delay relay DCR-1, a conductor 229, the normally closed contacts 1 and 2 of a delay control relay DCR, conductors 230 and 231, the now closed contacts 3 and 4 of the reader control relay RCR, a conductor 232, the normally closed contacts of a carriage return and tabulating contact CRTC, a conductor 233, the normally closed contacts 1 and 2 of a line skip switch S6, a conductor 234, the normally closed contacts 1 and 2 of a nonprint switch S5, a conductor 235, the contacts 2 and 3 of the start read switch S3 (when the latter is released to reclose these contacts), and the conductor 225 to the conductor 226 which has a negative potential impressed upon it except upon the occurrence of a stop code 1—2—8 as previously explained. The reader control magnet 67 upon becoming energized at the time the start read switch S3' is manually released permits tape to be moved through the reader for reading as explained in connection with Fig. 5.

The reproduction by the writing machine of information read from a tape by the reader is sufficiently rapid that reading must be temporarily halted during the relatively long interval required for each carriage return of the writing machine or for completion of carriage movement during a tabulation operation. Consider first the delay for carriage return. The carriage return code E. L. actuates the reader contact RC8, and the switch points 1 and 2 of the latter energize the translator magnet T8 to effect actuation of the carriage return key lever. The required delay of the reader is effected by closure of switch points 3 and 4 of the reader contact RC8 which effect energization of a reader delay control relay DCR. This energizing circuit may be traced from the positive terminal 98 of the power supply through a conductor 236, the contacts 14 and 15 of the nonprint relay NPR–3, conductors 237 and 238, the normally closed switch points 5 and 6 of the reader contact RC2, the conductor 206, and the switch points 3 and 4 of the reader contact RC8 to the conductor 203 which has a negative potential impressed upon it. It will be noted that this energizing circuit extends through switch points 5 and 6 of the reader contact RC2 to prevent picking up the delay relay DCR when the end of tape (with a "stop" code inadvertently omitted) passes beyond the reader pins of the reader or if the start read switch S3 is depressed without tape or a card in the reader. The delay control relay DCR thereupon picks up and immediately opens its contacts 1 and 2 to interrupt the energizing circuit of the reader control magnet 67 to terminate the reader operation. While it might seem that the delay control relay completes a hold circuit through its contacts 2 and 3 (and including the conductors 230 and 231, the contacts 3 and 4 of the reader control relay RCR, the carriage return and tabulating contact CRTC, the conductor 233, switch contacts 1 and 2 of the line skip switch S6, conductor 234, the contacts 1 and 2 of the nonprint switch S5, the conductor 235, the switch contacts 2 and 3 of the start read switch S3, and the conductor 225 to the conductor 226 which is at negative potential), such is not the case since it may be noted that this hold circuit includes the carriage return and tabulating contact CRTC which immediately opens its contacts when the carriage initiates its return and does not close them until carriage return has been completed. Thus the delay control relay again closes its contacts 1 and 2 after the short interval of its energization but the reader control magnet 67 is not immediately reenergized because its energizing circuit includes the now open carriage return and tabulating contact CRTC. Reading resumes when the latter contact again closes, at completion of carriage return, to reenergize the reader control magnet 67.

It may be noted that the energizing circuit of the delay control relay DCR includes both the contacts 14 and 15 of the nonprint relay NPR–3 and the contacts 11 and 12 of the line skip relay LSR. Accordingly, if the nonprint relays are energized for a nonprint operation, the writing machine is not reproducing the information of the read tape and the function of the delay control relay DCR is not needed. Likewise, a line skip operation (hereinafter described) so controls the writing machine that the latter again does not reproduce the information of the read tape so that the contacts 11 and 12 of the line skip relay LSR prevent energization of the delay control relay DCR for the reason that the function of this relay is not then needed.

A slight delay in the operation of the reader is also required to permit movement of the writing machine carriage to each tabulate position whenever a tape tabulate code (2—4—8—CH—0) is read. This delay is effected by the delay control relay DCR which in this instance is energized through an energizing circuit traced as follows: from the positive terminal 98 of the power supply through the conductor 236, the normally closed contacts 14 and 15 of the nonprint relay NPR–3, conductors 237 and 239, normally closed contacts 11 and 12 of the line skip relay LSR, a conductor 261, switch points 5 and 6 of the reader contact RC5, the conductor 210, switch points 5 and 6 of the reader contact RC6, the conductor 212, normally closed switch points 5 and 6 of the reader contact RC7, the conductor 209, switch points 3 and 4 of the reader contact RC4, the conductor 208, switch points 5 and 6 of the reader contact RC3, the conductor 207, normally closed switch points 5 and 6 of the reader contact RC1, and the conductor 203 to the negative terminal 99 of the power supply. As with the carriage return function previously described, the delay control relay DCR upon becoming energized interrupts the operation of the reader by opening its contacts 1 and 2 to deenergize the reader control magnet 67 until the hold circuit for the delay control relay DCR is interrupted by opening of the carriage return and tabulating contact CRTC. It may be noted in connection with this energization of the delay control relay DCR that its energization is prevented by opening of the contacts 14 and 15 of the nonprint relay NPR–3 or opening of the contacts 11 and 12 of the line skip relay LSR. This is because the writing machine is not printing when either of the last-mentioned relays are energized as earlier explained, and accordingly no delay of the reader is needed for purposes of carriage movement.

*Nonprint and print-restore operation*

A nonprint switch S5 is provided on the left side above the keyboard of the writing machine for manual actuation to enable the writing machine to bypass certain information of a tape in the reader. When this switch is manually pressed and released, the reader starts and continues to read the tape until it reaches the next stop code, but this interval of the reader operation does not cause the writing machine to print or otherwise operate. However, the information read from the tape and bypassed by the writing machine may be punched if desired into either one or both byproduct tapes depending upon the punch control code recorded in the read tape.

A similar nonprint operation can be automatically started and stopped by recorded codes in the program tape read at the reader. A "nonprint" key lever is provided by which to punch a nonprint code 4—8—CH into the tape, and when this key lever is automatically operated by the tape reader the following codes recorded in the read tape do not operate the writing machine but can be punched as desired into either or both byproduct tapes. A print-restore code 4—8—0 can be punched into the program tape by manual operation of a print restore code switch S8, provided to the right and above the keyboard of the writing machine, as earlier described. A nonprint operation when initiated automatically by operation of the "nonprint" key lever is restored only by reading a "print-restore" code, which incidentally does not interrupt the continued operation of the reader. This automatic print-restore operation differs from the manual initiation of a nonprint operation by the nonprint switch S5 where reproduction of the information of the tape read by the writing machine is restored only by reading a "stop" code which stops the reader, and this manually initiated nonprint operation is not restored by reading a print restore code.

The automatic nonprint operation has particular utility in automatically transferring certain codes from a read program tape to either or both byproduct tapes where these codes are not directly obtainable as a result of any one key lever operation but are obtainable by a special manual manipulation. The latter involves manual actuation of two or more selected key levers successively combined with manually turning back by one step after each key lever operation the program tape being punched at that time in the local No. 1 punch unit. These special program instruction codes are useful in the control of tape-to-card converters and computers and when so used provide additional functional controls of the latter. In using these special codes they are arranged to follow a nonprint code in the program tape and automatic operation of the "nonprint" key lever by this code in the program tape places the writing machine in nonprint condition so that the following special program instruction codes can be punched into either or both byproduct tapes directly from the reader.

Neither the nonprint code nor the print-restore code effect printing of characters by the writing machine nor spacing of the carriage.

A manual nonprinting operation is effected by manual actuation of the nonprint switch S5 to close its contacts 2 and 3 and thereby energize the pick-and-hold windings W1 of the nonprint relays NPR, NPR-1 and NPR-3. This energizing circuit may be traced from the positive terminal 98 of the power supply through conductors 240—244, the contacts 2 and 3 of the nonprint switch S5, the conductor 235, the contacts 1 and 2 of the start read switch S3, and the conductor 225 to the conductor 226 which has a negative potential impressed upon it in the absence of a stop code read at the reader. The nonprint relays NPR, NPR-1 and NPR-3 upon picking up establish a hold circuit through a conductor 245, the contacts 5 and 6 of the nonprint relay NPR-3, the conductor 246, the normally closed contacts 13 and 14 of a print restore relay PRR, a conductor 247, and the now closed holding contacts 1 and 2 of the read control relay RCR and the contacts 1 and 2 of the stop read switch S4 to the negatively energized conductor 226. It is to be noted that the hold circuit last described extends through the contacts 1 and 2 of the stop read switch S4 which accordingly may be manually actuated to interrupt the hold circuit for the nonprint relays and thereby restore the writing machine to print condition. Note further that the hold circuit for the nonprint relays extends to the conductor 226 which as pointed out above has a negative potential impressed upon it at all times except when a stop code 1—2—8 is read at the reader to actuate the reader contacts RC1, RC2 and RC4 concurrently. Thus termination of a manually initiated nonprint operation is effected either manually by operation of the stop read switch S4 or automatically by reading a stop code at the reader.

Actuation of the nonprint switch S5 to close its contacts 2 and 3 and energize the nonprint relays as above described interrupts the energizing circuit of the reader control magnet 67 and halts the operation of the reader until the switch S5 is manually released to reclose its contacts 1 and 2.

Automatic nonprint operation of the writing machine by reading a nonprint code 4—8—CH at the reader is accomplished by energization of a nonprint control relay NPCR. The latter is energized from the positive terminal 98 of the power supply through conductors 248 and 249, contacts 5 and 6 of the reader control relay RCR (energized at this time), a conductor 250, and the selector contact SC6 to the negative terminal 99 of the power source. The latter contact is actuated to its closed position, of course, through the code selector of the writing machine as a result of the "nonprint" key lever actuation effected by reading a nonprint code at the reader. The nonprint control relay NPCR upon picking up establishes a hold circuit through the conductor 248, its contacts 1 and 2, the contacts 1 and 2 of the print restore relay PRR, and a conductor 251 to the negative terminal 99 of the power supply. The contacts 5 and 6 of the nonprint control relay NPCR upon picking up establish an energizing circuit for the nonprint relays NPR, NPR-1 and NPR-3 from the negative terminal 99 of the power source through the contacts 11 and 12 of the print restore relay PRR, a conductor 252, and the conductors 240—243 to the positive terminal of the power source. The nonprint relays NPR, NPR-1 and NPR-3 include a second hold winding W2 which is energized during each reader cycle by the reader common contact RCC to insure that these relays remain energized completely through the reader cycle interval once the cycle has been initiated. The energizing circuit for this hold winding of the nonprint relays may be traced from the positive terminal 98 of the power source through conductors 253–255, the contacts 8 and 9 of the nonprint relay NPR-3, conductors 256 and 257, the switch points 3 and 4 of the reader common contact RCC, and the conductor 203 to the negative terminal 99 of the power supply.

When the reader reads a nonprint code, the reader's operation is temporarily halted for a short interval sufficient to permit the nonprint relays to pick up. This interruption is accomplished by a delay control relay DCR-1 which is energized by actuation of the nonprint code 4–8–CH reader contactors RC3, RC4 and RC5. The energizing circuit for the delay control relay DCR-1 may be traced from the positive terminal 98 of the power supply through the conductor 258, the contacts 1 and 2 of the line skip relay LSR, a conductor 259, the switch points 3 and 4 of the reader contact RC5, a conductor 260, the switch points 6 and 7 of the reader contact RC6, the conductor 212, the switch points 5 and 6 of the reader contact RC7, the conductor 209, the switch points 3 and 4 of the reader contact RC4, the conductor 208, the switch points 5 and 6 of the reader contact RC3, the conductor 207, the switch points 5 and 6 of the reader contact RC1, and the conductor 203 to the negative terminal 99 of the power supply. The delay control relay DCR-1 establishes a hold circuit through a conductor 262, its contacts 3 and 4, a conductor 263, and the normally closed contacts 7 and 8 of the nonprint relay NPR-1 to the negative terminal 99 of the power supply. Note that this hold circuit in extending through the contacts 7 and 8 of the nonprint relay NPR-1 insures that the delay control relay DCR-1 remains energized until the nonprint relays NPR, NPR-1 and NPR-3 become energized in the manner earlier explained and pick up. As long as the delay control relay DCR-1 remains energized, its contacts 1 and 2 interrupt the energizing circuit of the reader control magnet 67 to halt the reader operation for this interval.

In the delay operation last described, it may be noted that the delay control relay DCR-1 is directly energized by the reader contacts RC3, RC4 and RC5 so that the reader operation is immediately halted. The nonprint control relay NPCR on the other hand is energized by the code selector contact SC6 a short interval after the nonprint code has been read, has operated the nonprint key lever, and the latter in turn actuates the code selector contact SC6 through the code selector of the writing machine. A further short interval occurs after pick up of the nonprint control relay NPCR before it in turn is able to energize and pick up the nonprint relays NPR, NPR-1 and NPR-3 to release the delay control relay DCR-1 and permit the reader to continue its operation.

When the nonprint operation has been automatically initiated as above described by a nonprint code, it is desirable that the operation continue until a print restore code 4-8-0 is read at the reader. To this end, the contacts 3 and 4 of the nonprint control relay NPCR upon closing at the outset of the nonprint operation condition an energizing circuit for the print restore relay PRR. This energizing circuit may be traced from the positive terminal 98 of the power supply through the contacts 3 and 4 of the nonprint relay NPCR, a conductor 264, the normally closed switch points 6 and 7 of the reader contact RC5, the conductor 210, the switch points 5 and 6 of the reader contact RC6, the conductor 212, the normally closed switch points 5 and 6 of the reader contact RC7, the conductor 209, the switch points 3 and 4 of the reader contact RC4, the conductor 208, the switch points 5 and 6 of the reader contact RC3, the conductor 207, the normally closed contacts 5 and 6 of the reader contact RC1, and the conductor 203 to the negative terminal 99 of the power supply. A hold circuit for the print restore relay is established through its contacts 3 and 4, a conductor 265, and the now closed contacts 8 and 9 of the nonprint relay NPR-1 to the negative terminal 99 of the power supply. The print restore relay PRR in picking up interrupts at its contacts 1 and 2 the hold circuit of the nonprint control relay NPCR which thereupon drops out. The hold circuit for the nonprint relays NPR, NPR-1 and NPR-3 is interrupted when the contacts 13 and 14 of the print restore relay PRR is energized, and the nonprint relays thereupon drop out. In doing so, the hold circuit for the print restore relay PRR is interrupted by the opening of the contacts 8 and 9 of the nonprint relay NPR-1 so that the print restore relay PRR also drops out to complete the print restore operation.

*Line skip operation*

In many applications where a writing machine embodying the present invention is used with a program tape or card for preparation of form documents, a form may be used containing a sufficient number of lines for the maximum amount of entries even though only a few entries are made in each form preparation. The program tape must be made accordingly to contain sections for each line of the form, and each section will usually contain several stop codes. A writing machine embodying the present invention includes provision to enable selective line skip by manual operation so that the entire section of the program tape associated with a given line may pass continuously through the reader when no entry is to be made in that line. A "line skip" manual switch S6 is accordingly provided to the left and above the keyboard of the writing machine, and when this switch is pressed and released the reader starts and operates continuously without regard to any intervening stop codes of the program tape until the reader reaches a carriage return code and causes a line space operation and stops the reader. This enables a single manual operation of the line skip switch S6 automatically to line space the form whenever no entry is to be made in the line. Operation of the reader in response to pressing the line skip switch S6 permits automatic functioning of the carriage return only, and any other codes recorded in the program tape are ineffective to cause any operation of the writing machine. This maintains the same synchronization between the form in preparation and the program tape regardless of whether the tape is read in response to a "line skip" switch operation or a "start read" switch operation.

Considering the line skip operation in greater detail, manual actuation of the line skip switch S6 to close its contacts 2 and 3 effects energization of a line skip relay LSR and a line skip relay LSR-1. The energizing circuit for these relays may be traced from the positive terminal 98 of the power supply through a conductor 266, the contacts 2 and 3 of the line skip switch S6, the conductor 234, the contacts 1 and 2 of the nonprint switch S5, the conductor 235, the contacts 2 and 3 of the start read switch S3, and the conductor 225 to the negatively energized conductor 226. The line skip relay LSR upon picking up establishes through its contacts 15 and 16 a hold circuit for both the relay LSR and the relay LSR-1. This hold circuit includes a conductor 267, the contacts 15 and 16 of the relay LSR, a conductor 268, the normally closed contacts 11 and 13 of the delay control relay DCR, a conductor 269, and a conductor 270 to the negative terminal 99 of the power source.

It will be noted that this hold circuit includes the contacts 11 and 13 of the delay control relay DCR which, upon becoming energized in the manner explained above by a carriage return key lever operation at the end of the line, opens its contacts 11 and 13 to drop out both of the line skip relays LSR and LSR-1. The contacts 1 and 2 of the line skip relay LSR open to prevent energization of the nonprint delay relay DCR-1. The contacts 13 and 14 of the line skip relay LSR energize the translator magnet T5 which is effective to prevent selection of all key levers except the carriage return key lever. The energizing circuit for the translator magnet T5 is traced from the positive terminal 98 of the power supply through the conductor 223, the contacts 13 and 14 of the line skip relay LSR, a conductor 269, the conductor 213, the switch points 1 and 2 of the reader common contact RCC which close during each reader cycle, and the conductor 203 to the negative terminal 99 of the supply source.

The contacts 11 and 12 of the line skip relay LSR prevent energization of the delay control relay DCR for a tabulation operation since the writing machine is not printing during the line skip operation and no delay is accordingly needed for purposes of the carriage movement. The contacts 2 and 3 of the line skip relay LSR-1 through conductors 270 and 271 provide a circuit to energize the reader control magnet 67 which thus starts the reading operation. The reader control magnet is maintained energized during the line skip interval even though one or more stop codes are read at the reader during the line skip operation. This energizing circuit is opened when the line skip relay LSR-1 becomes deenergized in the manner earlier explained at the end of the line skip operation.

*Manual stop read operation*

The operation of the reader may be manually interrupted at any time by operation of the stop read switch S4. Such actuation interrupts the hold circuit of the reader control relay RCR, which extends through the contacts 1 and 2 of the latter and the contacts 1 and 2 of the stop read switch S4, and the read control relay RCR in dropping out opens its contacts 3 and 4 to interrupt the energizing circuit of the reader control magnet 67 and thus terminate operation of the reader. The reader is subsequently placed in operation again by manual actuation of the start read switch S3 to reenergize the reader control relay RCR.

Manual actuation of the stop read switch S4 is not effective, however, to stop operation of the reader if the prevailing operation of the writing machine is under control of the nonprint control relay NPCR. In this event, the reader control relay RCR is maintained energized (even though its hold circuit might otherwise be interrupted by the opening of the contacts 1 and 2 of the stop read switch S4) through a circuit which includes the conductor 247, contacts 13 and 14 of the print restore relay PRR, the conductor 246, the now closed contacts 5 and 6 of the nonprint relay NPR-1, the conductors 245, 243 and 252, the contacts 11 and 12 of the print restore relay PRR, and the now closed contacts 5 and 6 of the nonprint control relay NPCR to the negative terminal 99 of the power source.

*Parity check contact system*

The electrical circuit arrangement of the parity check contact system 184 of the writing machine and 187 of the remote punch unit is shown in Fig. 13. This system includes a plurality of single-pole, double-throw switches or contacts having terminals 276—309. These switches are electrically interconnected as shown and are operated singly or in pairs (indicated by the dash lines) by the punch pins of the punch unit as explained above in connection with Fig. 9. The input conductor 310 of the system is connected to the switch terminal 284, and the output conductor 311 of the system is connected to the switch terminal 289. It will be noted that a normally closed contact operated by the feed hole punch pin connects the input conductor 310 with the output conductor 311 at all times except when the punch pins are moved into punching position. The feed hole punch is always operated during a cycle of the punch so that this contact is then open, but an inspection of the complete circuit will show that at this time the conductors 310 and 311 are connected through various other circuits of the system whenever any odd number of the code hole punch pins are operated, but these conductors 310 and 311 are not connected whenever any even number of code hole punch pins are operated. In this, the feed hole punch pin is always operated and does not count as one of the code punch pins required in the odd number thereof to complete the electrical circuit of the system. For example, assume that the code punch pins 4—8—0 are actuated as required for the proper punching of the "print restore" code. The contact operated by the feed hole punch pin will then be open but another connection between conductors 310 and 311 will be established through the parity check system which may be traced from the input conductor 310 through the terminals 284, 277, 280, 283, 287, 294, 299, 306, 305, 308, 301, 296, 278, 279, and 289 to the output circuit conductor 311. By way of further example, assume that the zero punch pin failed to complete its punch stroke so that only the punch pins 4 and 8 were actuated. The electrical circuit of the parity check system is in this case open, when the feed hole pin contact opens, as will be seen by tracing as follows: from the input conductor 310 to the terminals 284, 277, 280, 283, 287, 294, 299, 307, 309, 300, 303, and 297 which is open to the output circuit conductor 311. In the specific construction of this parity check contact mechanism, the normally closed contact operated by the feed hole punch pin is arranged to remain closed during the transfer period of the other contacts operated by the code hole punch pins. This insures an uninterrupted connection between conductors 310 and 311 whenever an odd number of code hole punch pins are operated simultaneously with the operation of the feed hole punch pin. Thus it will be seen that, as explained above, correct parity check is indicated by the system when the odd-bit punch code used is satisfied by operation of an odd number of code hole punch pins to their fully operated position but not by operation of any even number of code hole punch pins.

Although the present parity check contact mechanism is described as operating to maintain a closed circuit between conductors 310 and 311 during the punching of an odd number of code holes, the mechanism can be connected when desired to maintain a closed circuit between input conductor 310 and an output conductor 312 only during the punching of an even number of code holes. The mechanism would be used in this manner with systems where codes are used involving only even numbers of bits or code holes in the tape.

While specific forms of the invention have been described for purposes of illustration, it is contemplated that numerous changes may be made without departing from the spirit of the invention.

We claim:

1. A writing machine for translating functional-control and character information comprising, reading means for developing control effects representative of such variety of functional-control and character information recorded in a first medium as may be required to duplicate format-composed printed copy, means responsive to control effects representative of such variety of functional-control and character information as may be required to duplicate format-composed printed copy for recording said last-mentioned information in a second medium, writing means operable in the alternative by manual actuation and automatically in response to said developed control effects for accomplishing format-composed printing of information while concurrently producing and supplying for use by said recording means functional and character control effects required to duplicate both said printed information in its entirety and the format thereof and irrespective of the manual and automatic nature of operation of said writing means, and means initially responsive to nonprint developed control effects for directing said developed control effects from said reading means directly to said recording means and subsequently responsive to print-restore developed control effects for directing said developed control effects directly to said writing means.

2. A writing machine for translating functional-control and character information comprising, reading means for developing control effects representative of such variety of functional-control and character information recorded in a first medium as may be required to duplicate format-composed printed copy, means responsive to control effects representative of such variety of functional-control and character information as may be required to duplicate format-composed printed copy for recording said last-mentioned information in a second medium, writing means operable in the alternative by manual actuation and automatically in response to said developed control effects for accomplishing format-composed printing of information while concurrently producing and supplying for use by said recording means functional and character control effects required to duplicate both said printed information in its entirety and the format thereof and irrespective of the manual and automatic nature of operation of said writing means, and means responsive to developed selection control effects for rendering said recording means selectively responsive and non-responsive to control effects supplied thereto at any time by said writing and reading means.

3. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, and means having an operation manually initiated but terminated by new-line initiation of said writing means for rendering said writing means nonresponsive to all said control effects developed by said reading means except new-line initiation control effects.

4. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, and means for continuously monitoring the code-bit parity operation of said recording means and responsive to departure from a preestablished code-parity operation thereof for terminating the operations of said reading and writing means.

5. A writing machine for translating functional-control and character information comprising, reading means for developing control effects representative of such variety of functional-control and character information recorded in a first medium as may be required to duplicate format-composed printed copy, means responsive to control effects representative of such variety of functional-control and character information as may be required to duplicate format-composed printed copy for recording said last-mentioned information in a second medium, writing means operable in the alternative by manual actuation and automatically in response to said developed control effects for accomplishing format-composed printing of information while concurrently producing and supplying for use by said recording means functional and character control effects required to duplicate both said printed information in its entirety and the format thereof and irrespective of the manual and automatic nature of operation of said writing means, means initially responsive to nonprint developed control effects for directing said developed control effects from said reading means directly to said recording means and subsequently responsive to print-restore developed control effects for directing said developed control effects directly to said writing means, and means responsive to developed selection control effects for rendering said recording means selectively responsive and nonresponsive to control effects supplied thereto at any time by said writing and reading means.

6. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, and means having an operation manually initiated but terminated by new-line initiation of said writing means for rendering said writing means nonresponsive to all said control effects developed by said reading means except new-line initiation control effects.

7. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, and means for continuously monitoring the code-bit parity operation of said recording means and responsive to departure from a preestablished code-parity operation thereof for terminating the operations of said reading and writing means.

8. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means responsive to developed selection control effects for rendering said recording means selectively responsive and nonresponsive to control effects supplied thereto at any time by said writing and reading means, and means having an operation manually initiated but terminated by new-line initiation of said writing means for rendering said writing means nonresponsive to all said control effects developed by said reading means except new-line initiation control effects.

9. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means responsive to developed selection control effects for rendering said recording means selectively responsive and nonresponsive to control effects supplied thereto at any time by said writing and reading means, and means for continuously monitoring the code-bit parity operation of said recording means and responsive to departure from a preestablished code-parity operation thereof for terminating the operations of said reading and writing means.

10. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means having an operation manually initiated but terminated by new-line initiation of said writing means for rendering said writing means nonresponsive to all said control effects developed by said reading means except new-line initiation control effects, and means for continuously monitoring the code-bit parity operation of said recording means and responsive to departure from a preestablished code-parity operation thereof for terminating the operations of said reading and writing means.

11. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, means responsive to developed selection control effects for rendering said recording means selectively responsive and nonresponsive to control effects supplied thereto at any time by said writing and reading means, and means having an operation manually initiated but terminated by new-line initiation of said writing means for rendering said writing means nonresponsive to all said control effects developed by said reading means except new-line initiation control effects.

12. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, means responsive to developed selection control effects for rendering said recording means selectively responsive and nonresponsive to control effects supplied thereto at any time by said writing and reading means, and means for continuously monitoring the code-bit parity operation of said recording means and responsive to departure from a preestablished code-parity operation thereof for terminating the operations of said reading and writing means.

13. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means responsive to developed selection control effects for rendering said recording means selectively responsive and nonresponsive to control effects supplied thereto at any time by said writing and reading means, means having an operation manually initiated but terminated by new-line initiation of said writing means for rendering said writing means nonresponsive to all said control effects developed by sad reading means except new-line initiation control effects, and means for continuously monitoring the code-bit parity operation of said recording means and responsive to departure from a preestablished code-parity operation thereof for terminating the operations of said reading and writing means.

14. A writing machine for translating functional-control and character information comprising, reading means for developing control effects representative of functional-control and character information recorded in a first medium, means responsive to control effects representative of functional-control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, means responsive to developed selection control effects for rendering said recording means selectively responsive and nonresponsive to control effects supplied thereto at any time by said writing and reading means, means having an operation manually initiated but terminated by a new-line initiation of said writing means for rendering said writing means nonresponsive to all said control effects developed by said reading means except new-line initiation control effects, and means for continuously monitoring the code-bit parity operation of said recording means and responsive to departure from preestablished code-parity operation thereof for terminating the operations of said reading and writing means.

15. A writing machine for translating functional-control and character information comprising, reading means for developing control effects representative of functional-control and character information recorded in a first medium, means responsive to control effects representative of functional control and character information for recording said last-mentioned information in a second medium, writing means operable in the alternative by manual actuation and in response to said developed control effects for printing information while concurrently producing and supplying for use by said recording means functional and character control effects required to duplicate said printed information, means initially responsive to nonprint developed control effects for directing said developed control effects from said reading means directly to said recording means and subsequently responsive to print-restore developed control effects for directing said developed control effects directly to said writing means, means responsive to developed control effects for rendering said recording means selectively responsive and nonresponsive to control effects supplied thereon at any time by said writing and reading means, means having an operation manually initiated but terminated by new-line initiation of said writing means for rendering said writing means nonresponsive to all said control effects developed by said reading means except new-line initiation control effects, means for continuously monitoring the code-bit parity operation of said recording means and responsive to departure from a preestablished code-parity operation thereof for terminating the operations of said reading and writing means, means responsive to manual actuation and to the form of recording medium employed for automatically selecting and supplying to said recording means control effects representing one form of delete coding for use with one form of recording medium and control effects representing another form of delete coding for use with another form of recording medium, and means responsive to a characteristic of one said form of recording medium for enabling initial pre-positional loading thereof into said reading means.

16. A writing machine for reading from and recording in record media functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-print controls operable in the alternative by one of manual and automatic control-effect actuations for accomplishing format-composed printing of information while concurrently producing control effects representative of functional and character information required to duplicate both said printed information in its entirety and the format thereof and irrespective of the manual and automatic nature of operation of said writing means, and control means responsive to function-information control effects developed by said reading means for automatically selectively rendering said recording means responsive and non-responsive to said control effects produced by said writing means.

17. A writing machine for reading and producing record media having recorded functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-print controls operable in the alternative by one of manual and control-effect actuations for printing information while concurrently producing control effects representative of functional and character information required to duplicate said printed information, and control means responsive to function-information control effects developed by said reading means for automatically selectively rendering at least one of said recording means responsive and nonresponsive to said control effects produced by said writing means.

18. A writing machine for reading and producing record media having recorded functional-control and character information comprising: means for reading a first medium to develop control effects representative of the information recorded therein; a first and a second recording means each responsive to control effects representative of functional-control and character information for recording said last-mentioned information in a medium individual thereto; writing means having functional and character-print controls operable in the alternative by one of manual and control-effect actuations for printing information while concurrently producing control effects representative of functional and character information required to duplicate said printed information; control means responsive to function-information control effects developed by said reading means for automatically selectively rendering one of said recording means responsive and nonresponsive to said control effects produced by said writing means; and manual selection means for controlling the other of said recording means to provide alternative modes of operation thereof, in the first of which said recording means is continuously responsive to the control effects produced by said writing means and in the second of which said recording means is selectively controlled by said control means to be responsive and nonresponsive to the control effects produced by said writing means.

19. A writing machine for reading and producing record media having recorded functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-print controls operable in the alternative by one of manual and automatic control-effect actuations for accomplishing format-composed printing of information while concurrently producing control effects representative of functional and character information required to duplicate both said printed information in its entirety and the format thereof and irrespective of the manual and automatic nature of operation of said writing means, and control means responsive to recorder-off and recorder-on function-information control effects developed by said reading means for automatically turning said recording means respectively off to be nonresponsive and on to be responsive to said control effects produced by said writing means.

20. A writing machine for reading and producing record media having recorded functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-print controls operable in the alternative by one of manual and control-effect actuations for printing information while concurrently producing control effects representative of functional and character information required to duplicate said printed information, and control means responsive to selectively distinctive recorder-off and recorder-on function-information control effects developed by said reading means for automatically concurrently turning both of said recording means off to be nonresponsive and thereafter turning at least one of said recording means on to be responsive to said control effects produced by said writing means.

21. A writing machine for reading and producing record media having recorded functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-print controls operable in the alternative by one of manual and control-effect actuations for printing information while concurrently producing control effects representative of functional and character information required to duplicate said printed information, and control means responsive to distinctively identified function-information control effects developed by said reading means for automatically concurrently rendering both said recording means non-responsive and thereafter selectively rendering both said recording means responsive selectively to said control effects produced by said reading means and by said writing means.

22. A writing machine for reading from and recording in record media functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-print controls operable in the alternative by one of manual and automatic control-effect actuations for accomplishing format-composed printing of information while concurrently producing control effects representative of functional and character information required to duplicate both said printed information in its entirety and the format thereof and irrespective of the manual and automatic nature of operation of said writing means, circuit control means for controlling the translation of control effects to said recording means, and means responsive to function-information control effects developed by said reading means for controlling said circuit control means to render said recording means selectively responsive to said control effects produced by said writing means and by said reading means.

23. A writing machine for reading and producing record media having recorded functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-print controls operable in the alternative by one of manual and control-effect actuations for printing information while concurrently producing control effects representative of functional and character information required to duplicate said printed information, first and second circuit control means for controlling the translation of control effects respectively to said first and second recording means, and control means responsive to function-information control effects developed by said reading means for selectively controlling said circuit control means to render said first and second recording means selectively responsive and non-responsive selectively to said control effects produced by said writing means and by said reading means.

24. A writing machine for reading and producing recorded media having recorded functional-control and character information comprising, means for reading a reading a first medium to develop control effects representative of the information recorded therein, a first and a second recording means each responsive to control effects representative of functional-control and character information for recording said last-mentioned information in a medium individual thereto, writing means having functional and character-print controls operable in the alternative by one of manual and control-effect actuations for printing information while concurrently producing control effects representative of functional and character information required to duplicate said printed information, first and second circuit control means for controlling the translation of control effects respectively to said first and second recording means, control means responsive to function-information control effects developed by said reading means for selectively controlling said circuit control means to render said first and second recording means selectively responsive and nonresponsive selectively to said control effects produced by said writing means and by said reading means, and manually actuable means for removing the recorder-selection control of said control means over one of said recording means and for causing said last-mentioned means to be selectively responsive and nonresponsive under control of said control means only to said control effects produced by said writing means.

25. A writing machine for reading from and recording in record media functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-printing controls operable in the alternative by one of manual and control-effect automatic actuations for accomplishing format-composed printing of information while concurrently producing control effects representative of functional and character information required to duplicate both said printed information in its entirety and the format thereof and irrespective of the manual and automatic nature of operation of said writing means, and means for selectively supplying as desired to said recording means control effects originating in said first medium and originating by operation of said writing means 26. A writing machine for reading from and recording in record media functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-printing controls operable in the alternative by one of manual and control-effect automatic actuations for accomplishing format-composed printing of information while concurrently producing control effects representative of functional and character information required to duplicate both said printed information in its entirety and the format thereof and irrespective of the manual and automatic nature of operation of said writing means, and means responsive to function-information control effects developed by said reading means for supplying selectively to said recording means control effects originating in said first medium and originating by operation of said writing means.

27. A writing machine for reading from and recording in record media functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-printing controls operable in the alternative by one of manual and control-effect actuations for printing information while concurrently producing control effects representative of functional and character information required to duplicate said printed information, and means for supplying selectively as desired to selected ones of said first and second recording means electrical control effects originating in said first medium and originating by operation of said writing means.

28. A writing machine for reading from and recording in record media functional-control and character information comprising, means for reading a first medium to develop control effects representative of the information recorded therein, a first and a second recording means each responsive to control effects representative of functional-control and character information for recording said last-mentioned information in a medium individual thereto, writing means having functional and character-printing controls operable in the alternative by one of manual and control-effect actuations for printing information while concurrently producing control effects representative of functional and character information required to duplicate said printed information, means for supplying selectively as desired to said recording means control effects developed by said reading means and produced by said writing means, and means for selectively controlling said first and said second recording means selectively to render each of said recording means responsive and nonresponsive to said control effects supplied thereto.

29. A writing machine for reading from and recording in record media functional-control and character information comprising, means for reading a first medium to develop control effects representative of such variety of information recorded therein as may be required to duplicate format-composed printed copy, means responsive to control effects representative of such variety of functional-control and character information as may be required to duplicate format-composed printed copy for recording said last-mentioned information in a second medium, writing means having functional and character-printing controls operable in the alternative by one of manual and control-effect automatic actuations for accomplishing format-composed printing of information while concurrently producing control effects representative of functional and character information required to duplicate both said printed information in its entirety and the format thereof and irrespective of the manual and automatic nature of operation of said writing means, control means responsive to nonprint information control effects developed by said reading means for supplying said developed control effects directly for use by said recording means, and control means responsive to print-restore information control effects developed by said reading means for supplying said developed control effects directly to said writing means.

30. A writing machine for reading from and recording in record media functional-control and character information comprising, means for reading a first medium to develop control effects representative of the information recorded therein, means responsive to control effects representative of functional-control and character information for recording said last-mentioned information in a second medium, writing means having functional and character-printing controls operable in the alternative by one of manual and control-effect actuations for printing information while concurrently producing control effects representative of functional and character information required to duplicate said printed information, control means responsive to manual actuation and to nonprint information control effects developed by said reading means for supplying the control effects of said reading means directly for use by said recording means and responsive respectively to stop-code control effects and print-restore control effects for supplying the developed control effects of said reading means directly to said writing means.

31. A writing machine for reading from and recording in record media functional-control and character information comprising, means for reading a first medium to develop control effects representative of the information recorded therein, means responsive to control effects representative of functional-control and character information for recording said last-mentioned information in a second medium, writing means having functional and character-printing controls operable in the alternative by one of manual and control-effect actuations for printing information while concurrently producing control effects representative of functional and character information required to duplicate said printed information, means responsive to manual actuation and to stop-coding control effect actuation developed by said reading means for alternately supplying the control effects of said reading means to said recording means and to said writing means, and means responsive to consecutive nonprint control effects and print-restore control effects developed by said reading means for overriding said actuations of said last-mentioned means and causing said alternate supply to be made solely in accordance with said last-mentioned control effects.

32. A writing machine for reading from and recording in record media functional-control and character information comprising, means for reading a first medium to develop control effects representative of the information recorded therein, means responsive to control effects representative of functional-control and character information for recording said last-mentioned information in a second medium, writing means having functional and character-printing controls operable in the alternative by one of manual and control-effect actuations for printing information while concurrently producing control effects representative of functional and character information required to duplicate said printed information, control-effect distributing means having a first operating condition in which the control effects of said reading means are supplied directly to said writing means and a second operating condition in which control effects are supplied directly for use by said recording means, a control relay responsive both to manual actuation and to nonprint control effect actuation by said reading means for actuating said distributing means to said second condition thereof and responsive to stop-code control effects of said reading means for actuating said distributing means to said first operating condition thereof, and a print restore relay responsive to print restore control effects of said reading means to cause said control relay to actuate said distributing means to said first operating condition thereof.

33. A writing machine for reading from and recording in record media functional-control and character information comprising, means for reading a first medium to develop control effects representative of the information recorded therein, means responsive to control effects representative of functional-control and character information for recording said last-mentioned information in a second medium, writing means having functional and character-printing controls operable in the alternative by one of manual and control-effect actuations for printing information while concurrently producing control effects representative of functional and character information required to duplicate said printed information, nonprint relay means having a first operating condition in which the control effects developed by said reading means are supplied directly to said writing means and having a second operating condition in which said control effects are supplied directly for use by said recording means, a nonprint control relay actuated manually and by nonprint control effects of said reading means for conditioning selection of a print-restore relay and for actuating said nonprint relay means to said second operating condition thereof, and a print-restore relay responsive to print-restore control effects of said reading means to deactivate said nonprint control relay and thereby actuate said nonprint relay means to said first operating condition thereof.

34. A writing machine for reading from and recording in record media functional-control and character information comprising, means for reading a first medium to develop control effects representative of the information recorded therein, means responsive to control effects representative of functional-control and character information for recording said last-mentioned information in a second medium, writing means having functional and character-printing controls operable in the alternative by one of manual and control-effect actuations for printing information while concurrently producing control effects representative of functional and character information required to duplicate said printed information, control effect distributing means having first and second operating conditons in which the control effects developed by said reading means are supplied for use respectively by said recording means and by said writing means, means responsive to nonprint control effects developed by said reading means for actuating said distributing means to said second operating condition thereof, and means responsive to nonprint control effects developed by said reading means for delaying the operation of said reading means for the interval required for said distributing means to change from said first to said second operating condition thereof.

35. A writing machine controllable by functional control and character information recorded in a record medium comprising, means for reading said medium to develop control effects representative of the information recorded therein, writing means having functional and character printing controls operable in the alternative by one of manual and control-effect actuations for printing information, means for supplying the control effects developed by said reading means to said writing means, and selectable means for terminating all control over said writing means by the control effects of said reading means except new-line control effects and responsive to the condition of said writing means in readiness to initiate a new line for restoring the control over said writing means of the control effects developed by said reading means.

36. A writing machine controllable by functional control and character information recorded in a record medium comprising, means for reading said medium to develop control effects representative of the information recorded therein, writing means having functional and character-printing controls operable in the alternative by one of manual and control-effect actuations for printing information, means for supplying the control effects developed by said reading means to said writing means, manually actuable means effective when actuated to terminate all control over said writing means by control effects of said reading means except carriage-return control effects, and means responsive to the succeeding carriage-return control effect developed by said reading means and the completion of carriage return of said writing means for deactivating said last-mentioned means to restore the control over said writing means of the control effects developed by said reading means.

37. A writing machine controllable by functional control and character information recorded in a record medium comprising, means for reading said medium to develop control effects representative of the information recorded therein, means for manually initiating the operation of said reading means but responsive to stop-code control effects developed thereby for terminating operation of said reading means, writing means having functional and character-printing controls operable in the alternative by one of manual and control-effect actuations for printing information, means for supplying the control effects developed by said reading means to said writing means, and selectable means for maintaining said reading means in operation irrespective of stop-code control effects developed thereby and for terminating all control over said writing means by the control effects of said reading means except carriage-return control effects but responsive to the carriage return of said writing means for restoring the control over said writing means of the control effects developed by said reading means and for restoring the control of stop-code control effects developed by said reading means over the operation thereof.

38. A writing machine controllable by functional control and character information recorded in a record medium comprising, means for reading said medium to develop control effects representative of the information recorded therein, writing means having functional and character-printing controls operable in the alternative by one of manual and control-effect actuations for printing information, means for supplying the control effects developed by said reading means to said writing means, means responsive to tabulate-code control effects developed by said reading means for delaying the operation of said reading means until the carriage of said writing means has completed its movement to the tabulate position thereof, and selectable means for deactivating said delay means for terminating all control over said writing means by the control effects of said reading means except carriage-return control effects but responsive to carriage return of said writing means for restoring the control over said writing means of the control effects developed by said reading means and for restoring the response of said delay means to said tabulate-code control effects developed by said reading means.

39. A writing machine controllable by functional control and character information recorded in a record medium comprising, means for reading said medium to develop control effects representative of the information recorded therein, writing means having functional and character-printing controls operable in the alternative by one of manual and control-effect actuations for printing information, means responsive to tabulate-code control effects developed by said reading means for delaying the operation of said reading means until the carriage of said writing means has completed its movement to the tabulate position thereof, means responsive to nonprint and print-restore control effects developed by said reading means for respectively terminating and restoring the supply of said developed control effects to said writing means and for respectively deactivating and reactivating said delay means, and selectable means for additionally deactivating said delay means and for terminating all control over said writing means by the control effects of said reading means except carriage-return control effects but responsive to the carriage return of said writing means for restoring the control thereover of the control effects developed by said reading means and for restoring the response of said delay means to said tabulate-code control effects developed by said reading means.

References Cited in the file of this patent
UNITED STATES PATENTS

| | | |
|---|---|---|
| 1,259,040 | Myers | Mar. 12, 1918 |
| 1,975,791 | Hopkins | Oct. 9, 1934 |
| 2,540,029 | Hamilton et al. | Jan. 30, 1951 |
| 2,669,303 | Hendrich | Feb. 16, 1954 |
| 2,700,446 | Blodgett | Jan. 25, 1955 |
| 2,704,186 | Braun | Mar. 15, 1955 |
| 2,731,200 | Koelsch | Jan. 17, 1956 |